US012518111B2

(12) United States Patent
Lou et al.

(10) Patent No.: US 12,518,111 B2
(45) Date of Patent: Jan. 6, 2026

(54) AUTOMATING LARGE-SCALE DATA COLLECTION

(71) Applicant: Oracle International Corporation, Redwood Shores, CA (US)

(72) Inventors: Paria Jamshid Lou, Sydney (AU); Gioacchino Tangari, Sydney (AU); Jason Black, Redmond, WA (US); Bhagya Gayathri Hettige, Melbourne (AU); Xu Zhong, Melbourne (AU); Poorya Zaremoodi, Melbourne (AU); Thanh Long Duong, Seabrook (AU); Mark Edward Johnson, Sydney (AU)

(73) Assignee: Oracle International Corporation, Redwood Shores, CA (US)

( * ) Notice: Subject to any disclaimer, the term of this patent is extended or adjusted under 35 U.S.C. 154(b) by 221 days.

(21) Appl. No.: 18/452,803

(22) Filed: Aug. 21, 2023

(65) Prior Publication Data

US 2024/0169161 A1 May 23, 2024

Related U.S. Application Data

(60) Provisional application No. 63/384,468, filed on Nov. 21, 2022.

(51) Int. Cl.
*G06F 40/40* (2020.01)
*G06F 40/284* (2020.01)
(Continued)

(52) U.S. Cl.
CPC ............ *G06F 40/40* (2020.01); *G06F 40/284* (2020.01); *G06F 40/289* (2020.01); *G10L 15/063* (2013.01)

(58) Field of Classification Search
CPC ....... G10L 15/063; G10L 21/10; G10L 15/26; G10L 15/08; G10L 15/1815;
(Continued)

(56) References Cited

U.S. PATENT DOCUMENTS 9,235,634 B2 * 1/2016 Georgakis ............... G06F 16/48
9,836,455 B2 * 12/2017 Martens ................ G06F 40/279
(Continued)

OTHER PUBLICATIONS

Ye et al. (Multilingual taxonomic web page classification for contextual targeting at yahoo)—Proceedings of the 28th . . . , 2022—dl.acm.org (Year: 2022).*

(Continued)

*Primary Examiner* — Abdelali Serrou
(74) *Attorney, Agent, or Firm* — Kilpatrick Townsend & Stockton LLP

(57) ABSTRACT

Obtaining collections of sentences in different languages that are usable for training models in various applications of artificial intelligence is provided. A method is provided that obtains, from text corpus, webpages in a plurality of languages, each of the webpages corresponding to an URL; obtains annotations for each of the webpages based on its URL, to obtain annotated data entries corresponding to the webpages, each of the annotated data entries including a classification label corresponding to a sub-topic of one of a plurality of topics, where each of the plurality of topics includes a corresponding plurality of sub-topics; filters the annotated data entries to obtain topic-specific content in a target language based on the classification labels, the topic-specific content corresponding to one or more sub-topics; performs post-processing on the topic-specific content to obtain result data; and outputs the result data for the topic.

16 Claims, 16 Drawing Sheets

(51) Int. Cl.
*G06F 40/289* (2020.01)
*G10L 15/06* (2013.01)
(58) Field of Classification Search
CPC .............. G10L 2015/088; G10L 25/48; G10L 15/1822; G06F 40/284; G06F 40/289; G06F 40/30; G06F 40/40; G06F 16/7867; G06F 16/4387; G06F 16/48; G06F 16/7834; G06F 16/7847; G06F 16/285; G06F 16/7844; G06F 18/254; G06F 16/244; G06F 16/248; G06F 16/35; G06F 16/353; G06F 16/36; G06F 16/4393; G06F 16/5838; G06F 16/5846; G06F 16/632; G06F 16/685; G06F 16/739; G06F 16/9535; G06F 40/137; G06F 40/20; G06F 40/258; G06F 40/268; G06F 40/279; G06F 40/56
See application file for complete search history.

(56) References Cited

U.S. PATENT DOCUMENTS

| | | | | |
|---|---|---|---|---|
| 10,282,425 | B2* | 5/2019 | Shaw | G06F 16/4387 |
| 11,321,615 | B1 | 5/2022 | Genkin et al. | |
| 2010/0241633 | A1* | 9/2010 | Lotito | G06F 16/9535 |
| | | | | 707/769 |
| 2010/0306144 | A1* | 12/2010 | Scholz | G06F 16/353 |
| | | | | 707/E17.014 |
| 2011/0301938 | A1* | 12/2011 | Agrawal | G06F 16/958 |
| | | | | 704/8 |
| 2018/0246972 | A1* | 8/2018 | Shukla | G06F 16/9535 |
| 2020/0151245 | A1* | 5/2020 | Maratta | G06F 40/205 |
| 2022/0293107 | A1* | 9/2022 | Leaman | G06F 16/951 |

OTHER PUBLICATIONS

Baykan et al. (A Comprehensive Study of Techniques for URL-Based Web Page Language Classification), ACM Transactions on the Web (TWEB), vol. 7, Issue 1 Article No. 3, pp. 1-37—https://doi.org/10.1145/2435215.2435218 (Year: 2013).*
Approximate K-NN Search, Approximate Search-Open Distro Documentation, Available Online at: https://opendistro.github.io/for-elasticsearch-docs/docs/knn/approximate-knn/, Accessed from Internet on Aug. 23, 2023, 5 pages.
Benchmarking Results, ANN-Benchmarks, Available Online at: https://ann-benchmarks.com/, Accessed from Internet on Aug. 23, 2023, 27 pages.
DMOZ, Creative Commons Attribution 3.0 Unported, Open Directory License, Available online at: https://en.wikipedia.org/wiki/DMOZ, Jun. 5, 1998, 14 pages.
DMOZ Internet Directory, Presented by DMOZLive.com, Available online at: http://dmozlive.com/, Aug. 17, 2023, 1 page.
Examples Using Common Crawl Data, Common Crawl, Available online at: https://commoncrawl.org/the-data/examples/, Aug. 17, 2023, 21 pages.
MLRun, GitHub, Machine Learning automation and tracking, Available Online at: https://github.com/mlrun/mlrun, Accessed from Internet on Aug. 23, 2023, 4 pages.
Parallelized ML Inference, Aws-Samples, GitHub, Available Online at: https://github.com/mlrun-samples/parallelize-ml-inference/blob/master/src/ml-inference/parallize_inference_pool.py, Accessed from Internet on Aug. 23, 2023, 4 pages.
URL Classification DMOZ, Available online at: https://www.kaggle.com/datasets/revanthrex/url-classification, Aug. 17, 2023, 1 page.
WARCannon—Catastrophically Powerful Parallel WARC Processing, Available online at: https://github.com/c6fc/warcannon, Sep. 7, 2022, 12 pages.
Girard, Parse Petabytes of Data from CommonCrawl in Seconds, Available online at: https://www.primates.dev/parse-petabytes-of-data-from-commoncrawl-in-seconds/, Jan. 21, 2020, 6 pages.

Grave et al., Learning Word Vectors for 157 Languages, Proceedings of the Eleventh International Conference on Language Resources and Evaluation, Available Online at: https://aclanthology.org/L18-1550.pdf, May 2018, pp. 3483-3487.
Hoek, Web Classification Using DMOZ, Bachelor Thesis Computing Science, Available online at: https://www.cs.ru.nl/bachelors-theses/2021/Lisa_Hoek_1009553_Web_classification_using_DMOZ.pdf, Jan. 17, 2021, 47 pages.
Mackenzie et al., CC-News-En: A Large English News Corpus, CIKM Conference, Available Online at: https://people.eng.unimelb.edu.au/ammoffat/abstracts/cikm20ccnews.pdf, Oct. 19-23, 2020, 8 pages.
Manning et al., The Stanford CoreNLP Natural Language Processing Toolkit, Proceedings of 52nd Annual Meeting of the Association for Computational Linguistics: System Demonstrations, Association for Computational Linguistics, Available online at: https://www.aclweb.org/anthology/P14-5010.pdf, Jun. 2014, pp. 55-60.
Mukhopadhyay et al., Domain-Specific Crawler Design, Web Searching and Mining, Available online at: https://www.researchgate.net/publication/333747680, Jul. 31, 2019, pp. 85-112.
Remus et al., Domain-Specific Corpus Expansion with Focused Webcrawling, Proceedings of the Tenth International Conference on Language Resources and Evaluation (LREC'16), Available online at: https://aclanthology.org/L16-1572, May 2016, pp. 3607-3611.
Rettig et al., Fusing Vector Space Models for Domain-Specific Applications, Conference: 2019 IEEE 31st International Conference on Tools with Artificial Intelligence (ICTAI), Available online at: https://arxiv.org/pdf/1909.02307.pdf, Sep. 5, 2019, 8 pages.
Shang et al., Automated Phrase Mining from Massive Text Corpora, IEEE Transactions on Knowledge and Data Engineering, Available online at: https://arxiv.org/pdf/1702.04457.pdf, Mar. 11, 2017, 14 pages.
Srivastava et al., Time and Domain Specific Twitter Data Mining for Plastic Ban based on Public Opinion, Proceedings of the Second International Conference on Innovative Mechanisms for Industry Applications (ICIMIA 2020), IEEE Xplore Part No. CFP20K58-ART, Mar. 5-7, 2020, pp. 755-761.
Suarez et al., A Monolingual Approach to Contextualized Word Embeddings for Mid-Resource Languages, Proceedings of the 58th Annual Meeting of the Association for Computational Linguistics, Available online at: https://arxiv.org/pdf/2006.06202.pdf, Jun. 18, 2020, 13 pages.
Suarez et al., Asynchronous Pipeline for Processing Huge Corpora on Medium to Low Resource Infrastructures, HAL Open Science, Available Online at: https://inria.hal.science/hal-02148693/file/Asynchronous_Pipeline_for_Processing_Huge_Corpora_on_Medium_to_Low_Resource_Infrastructures.pdf, Jul. 13, 2019, 8 pages.
Wahed et al., SAUCE: Truncated Sparse Document Signature Bit-Vectors for Fast Web-Scale Corpus Expansion, Computation and Language, Available online at: https://arxiv.org/pdf/2108.11948.pdf, Aug. 26, 2021, 11 pages.
Wang, Parallelizing Across Multiple Cpu/gpus to Speed Up Deep Learning Inference at the Edge, AWS Machine Learning Blog, Available Online at: https://aws.amazon.com/blogs/machine-learning/parallelizing-across-multiple-cpu-gpus-to-speed-up-deep-learning-inference-at-the-edge/, Aug. 20, 2019, 12 pages.
Wenzek et al., CCNet: Extracting High Quality Monolingual Datasets from Web Crawl Data, Available Online at: https://arxiv.org/pdf/1911.00359.pdf, Nov. 15, 2019, 9 pages.
Zhao et al., Understanding Data Storage and Ingestion for Large-Scale Deep Recommendation Model Training, In The 49th Annual International Symposium on Computer Architecture (ISCA 2022), Available online at: https://arxiv.org/pdf/2108.09373.pdf, Apr. 22, 2022, 16 pages.
Chollet, Multi-GPU and Distributed Training, Keras, Available online at https://keras.io/guides/distributed_training, Apr. 29, 2020, 8 pages.
Dkeras-project/dkeras, Available online at https://github.com/dkeras-project/dkeras, retrieved Aug. 28, 2023, 5 pages.
Model Interference Using TensorFlow Keras API, Databricks on AWS, Available online at https://docs.databricks.com/en/machine-learning/model-inference/resnet-model-inference-keras.html, Jul. 11, 2023, 1 page.

(56) References Cited

OTHER PUBLICATIONS

Facebookresarch/cc_net, Available online at https://github.com/facebookresearch/cc net, retrieved Aug. 17, 2023, 5 pages.

"Data Collection for Artificial Intelligence and Machine", Available online at: https://www.tagxdata.com/datacollection/, Accessed from Internet on Feb. 21, 2023, 4 pages.

"Data Collection for Machine Learning", Mindy Support Outsourcing, Available online at: https://mindy-support.com/services-post/data-collection/, Jul. 2022, 5 pages.

* cited by examiner

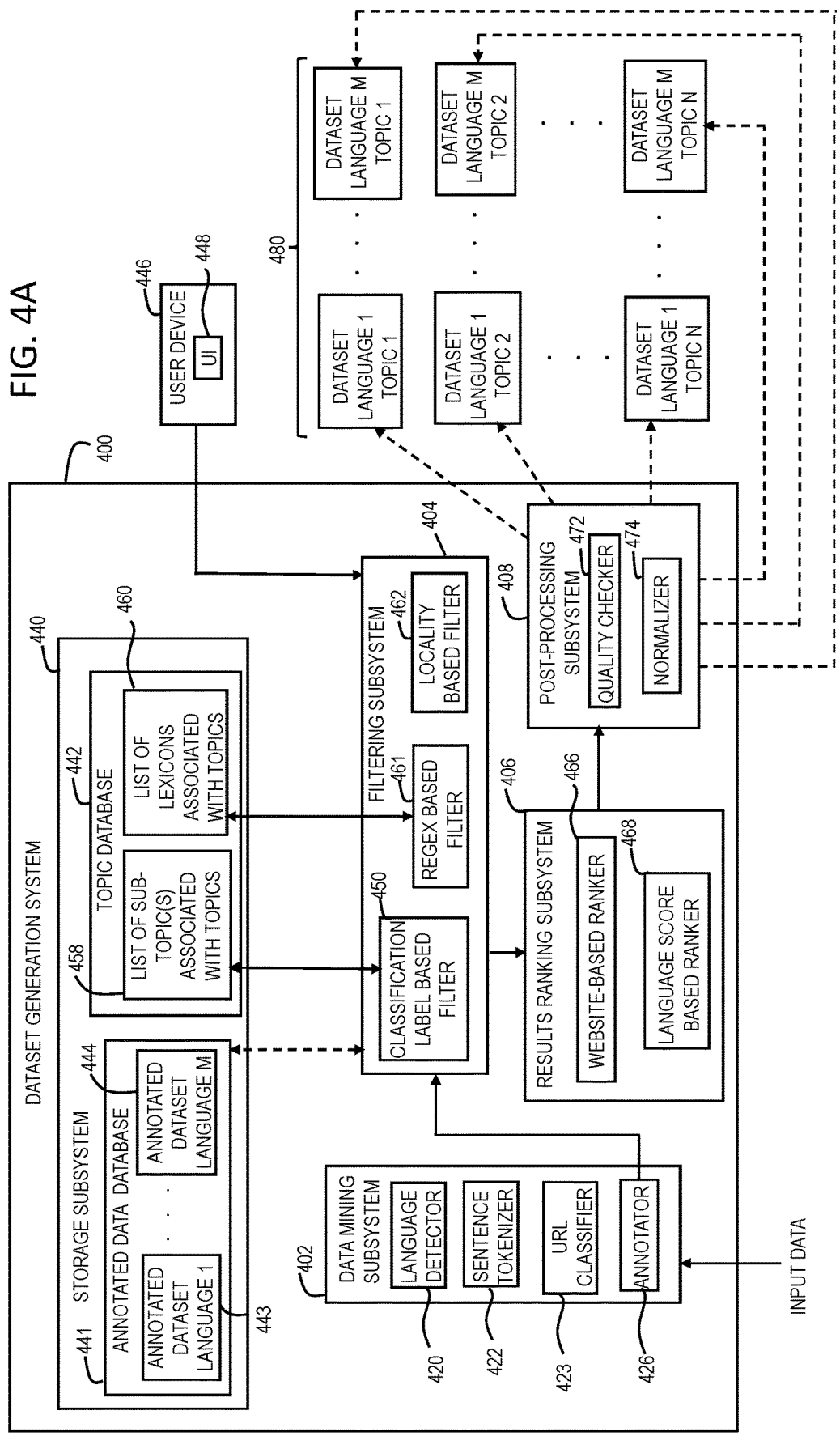

FIG. 4B

Example of an URL labeled with classification labels amazon.com →
Top/Shopping/Entertainment|Top/Shopping/General_Merchandise/Major_Retailers|
Top/Regional/North_America/United_States/Washington/Localities/S/Seattle/Bus
iness_and_Economy/Shopping/Books

```
{
  "url": "https://www.alzforum.org/news/research-news/dopamine-and-synuclein-are-found-be-chemically-linked",  ── 432
  "classification":
  "Top/Health/Conditions_and_Diseases/Neurological_Disorders/Alzheimer's/Research",  ── 434
  "language": "en",
  "language_score": 0.95,  ── 436
  "title": "Dopamine and α-Synuclein Are Found to Be Chemically Linked ¦ ALZFORUM",
  "raw_content": "Dopamine and α-Synuclein Are Found to Be Chemically Linked\nBoth the protein α-synuclein, one of the major components of Lewy bodies, and the neurotransmitter dopamine have come under scrutiny as potential mediators of the neuronal loss in the substantia nigra that occurs in Parkinson's disease. These two molecules are now linked by new evidence, reported in to day's Science, which indicates that dopamine-derived orthoquinone (DAQ) can form an adduct with α-synuclein that inhibits its fibrillization.—Tom Fagan\nConway KA, Rochet JC, Bieganski RM, Lansbury PT. Kinetic stabilization of the alpha-synuclein protofibril by a dopamine-alpha-synuclein adduct. Science. 2001 Nov 9;294(5545):1346-9. PubMed.",
  "sentences": ["Dopamine and α-Synuclein Are Found to Be Chemically Linked ¦ ALZFORUM", "Both the protein α-synuclein, one of the major components of Lewy bodies, and the neurotransmitter dopamine have come under scrutiny as potential mediators of the neuronal loss in the substantia nigra that occurs in Parkinson's disease. These two molecules are now linked by new evidence, reported in today's Science, which indicates that dopamine-derived orthoquinone (DAQ) can form an adduct with α-synuclein that inhibits its fibrillization." , "—Tom Fagan", "; Conway KA, Rochet JC, Bieganski RM, Lansbury PT. Kinetic stabilization of the alpha-synuclein protofibril by a dopamine-alpha-synuclein adduct. Science. 2001 Nov 9;294(5545):1346-9. PubMed."]
}
```

| Example of URLs containing locale information |
|---|
| "url":"https://rire.ctreq.qc.ca/2018/01/neuromythes-education" |
| "url":"http://www.prologue.ca/742782-151-livre-Adulte/Cafe corse.html?tri=10 desc 1 asc&idiRetour=2&pRetour=03 101&page=1" |
| "url":"https://www.zwilling.com/ca-fr-new/zwilling-pro-14-cm-couteau-%C3%A0-d%C3%A9sosser-38404-141/38404-141-0.html" |

464

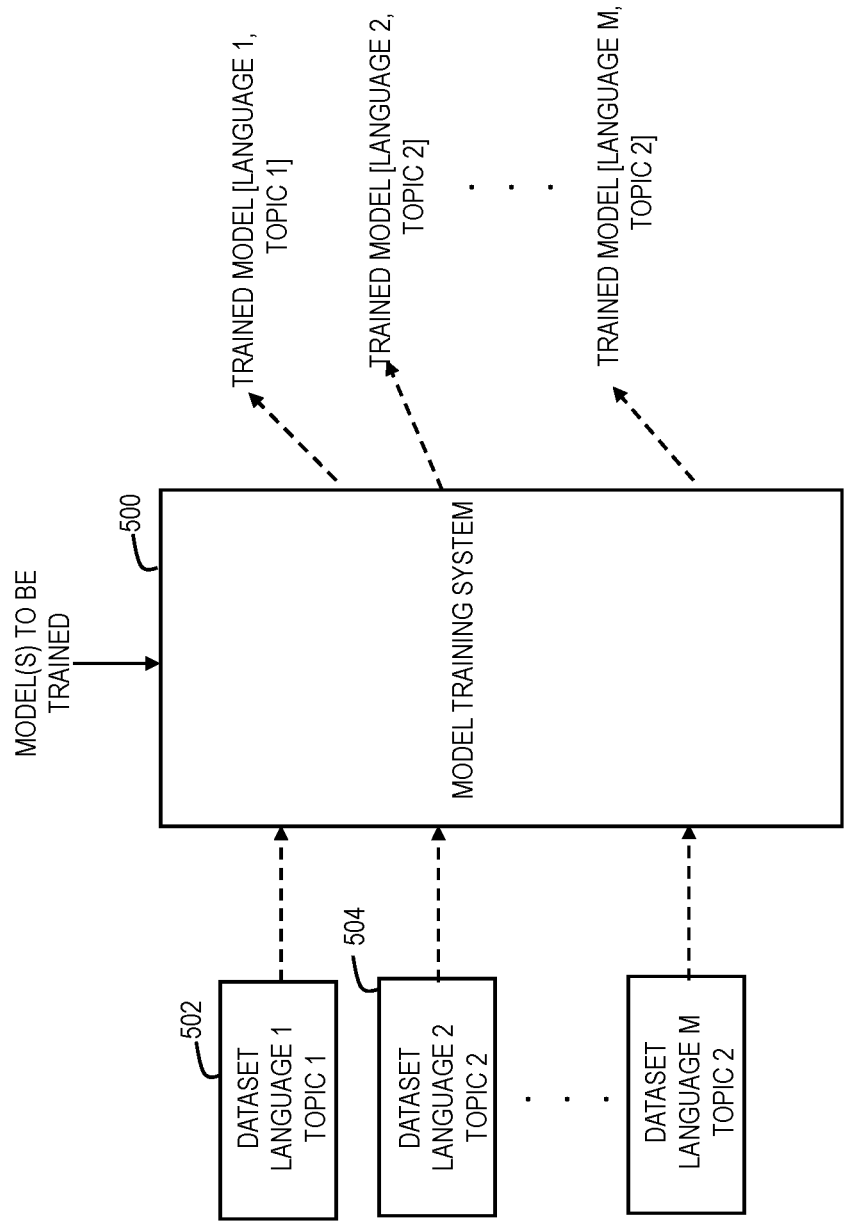

FIG. 7

List of health and medical sub-topics

...
Business/Financial_Services/Insurance
Business/Healthcare/Nursing
Business/Healthcare/Products_and_Services
Health/Children_Health/Conditions_and_Diseases
Health/Dentistry Health/Men's_Health
Health/Mental_Health Health/Optical_Health/Treatments
Health/Women's_Health Healthcare/Pharmacy
Travel/Specialty_Travel/Medical_Tourism
...

List of keywords in health and medical topics

| | |
|---|---|
| Aminophylline | Abetalipoproteinemia |
| Beclazone | Coagulation Disorders |
| Budesonide | Eosinophilia |
| Flixotide | Hemochromatosis |
| Fluticasone | Hemophilia |
| Ipratropium | Leukemia |
| Montelukast | Lymphedema |
| Omalizumab | Lymphoma |
| Pirbuterol | Multiple Myeloma |
| Prednisolone | Myelodysplastic Syndromes |
| Salbutamol | Neutropenia |
| Salmeterol | Platelet Disorders |
| Theophylline | POEMS Syndrome |
| Zafirlukast | Sickle Cell |
| Zyflo | Thalassemia |
| | von Willebrand |

AUTOMATING LARGE-SCALE DATA COLLECTION

CROSS-REFERENCE TO RELATED APPLICATION(S)

The present application is a non-provisional application of and claims the benefit and priority under 35 U.S.C. 119(e) of U.S. Provisional Application No. 63/384,468, filed Nov. 21, 2022, the entire contents of which are incorporated by reference herein for all purposes.

FIELD

The present disclosure relates generally to artificial intelligence techniques, and more particularly, to obtaining, from a large text corpus, collections of sentences in different languages that are usable for training models in various applications of artificial intelligence.

BACKGROUND

Artificial intelligence has many applications. For example, many users use instant messaging or chat platforms to get instant reaction. Organizations often use the instant messaging or chat platforms to engage with customers (or end users) in live conversations. However, it can be very costly for organizations to employ service people to engage in live communication with customers or end users. Chatbots or bots have begun to be developed to simulate conversations with end users, especially over the Internet. End users can communicate with bots through messaging apps that the end users have already installed and used. An intelligent bot, generally powered by artificial intelligence, can communicate more intelligently and contextually in live conversations, and thus may allow for a more natural conversation between the bot and the end users for improved conversational experience. Instead of the end user learning a fixed set of keywords or commands that the bot knows how to respond to, an intelligent bot may be able to understand the end user's intention based upon user utterances in natural language and respond accordingly.

Machine learning (ML) is an area of artificial intelligence where computers have the capability to learn without being explicitly programmed. There are different types of ML techniques including supervised learning techniques, unsupervised learning techniques, and others. In a supervised learning technique, an ML model is created and trained using training data, where the training data includes multiple training examples, each training example including an input and a known output corresponding to the input (e.g., a ground truth). To train the ML technique(s) or model(s), precise training data is required to enable the algorithms to understand and learn certain patterns or features (e.g., for chatbots—intent extraction and careful syntactic analysis, not just raw language processing) that the ML technique(s) or model(s) will use to predict the outcome desired (e.g., inference of an intent from an utterance).

The accuracy of ML models (e.g., automatic speech recognition (ASR) systems) is directly proportional to the quantity and quality of training data. Collecting a large amount of training data and making sure that it satisfies the task-specific requirements is a challenging, cost- and time-consuming process. In the related art, the collected data and utterances are selected randomly across the domains. However, the customers desire the models be pre-trained on the specific data, e.g., a domain-specific data, a task-specific data, a locality-specific data, a topic-specific data, etc. Additionally, the related art systems and methods lack control over the collected data quality and accuracy. Further, the related art systems and methods cannot provide high-quality large data in different languages across various domains.

SUMMARY

Techniques disclosed herein relate generally to artificial intelligence techniques. More specifically and without limitation, techniques disclosed herein relate to a novel technique for obtaining, from a large text corpus, collections of sentences in different languages that are usable for training models in various applications of AI according to a pre-defined topic. The techniques described herein enable the system to filter a large text corpus, to obtain the dataset in a target language according to a target topic with high levels of accuracy. Various embodiments are described herein to illustrate various features. These embodiments include various methods, systems, non-transitory computer-readable storage media storing programs, code, or instructions executable by one or more processors, and the like.

In various embodiments, a computer-implemented method is provided that includes: (a) obtaining, from a text corpus, a plurality of webpages in a plurality of languages, each of the plurality of webpages corresponding to a respective universal resource locator (URL); (b) annotating each of the plurality of webpages based on the respective URL, to obtain annotated data entries corresponding to the plurality of webpages, each of the annotated data entries including a classification label corresponding to a sub-topic of one of a plurality of topics, where each of the plurality of topics includes a corresponding plurality of sub-topics; (c) performing a first filtering for the annotated data entries to obtain topic-specific content in a target language among the plurality of languages by: comparing one or more sub-topics associated with a topic among the plurality of topics with classification labels correspondingly included in the annotated data entries, and obtaining, from the annotated data entries, the topic-specific content corresponding to the one or more sub-topics based on the comparing; (d) performing post-processing on the topic-specific content to obtain result data, by performing at least one from among a second filtering and a normalizing, on sentences included in the topic-specific content; and outputting the result data for the topic for which (c) and (d) were performed.

In some embodiments, the first filtering further includes comparing keywords of a predetermined lexicon for the topic and words in sentences included in one from among the topic-specific content and the annotated data entries; and obtaining the sentences containing the keywords, to generate lexicon-specific content.

In some embodiments, the first filtering further includes obtaining, from the topic-specific content, variation-specific content corresponding to a variation of the target language, by searching URLs of webpages corresponding to the topic-specific content for an indication of a geographic locality corresponding to the variation, where (d) is performed for the variation-specific content corresponding to the variation of the target language.

In some embodiments, the obtaining the plurality of webpages further includes detecting a language of the plurality of webpages, respectively; computing a language confidence score for the language detected for each the plurality of webpages; and discarding, from the plurality of webpages, webpages whose language confidence score is less than a predetermined threshold, prior to the annotating.

In some embodiments, the obtaining the plurality of webpages further includes tokenizing raw content included in each of the plurality of webpages into sentences, where the sentences included in the topic-specific content are tokenized sentences.

In some embodiments, the post-processing further includes performing the second filtering on the sentences included in the topic-specific content to remove, from the topic-specific content, at least one from among an incomplete sentence and a grammatically incorrect sentence, to obtain a set of high-quality sentences; and normalizing the set of high-quality sentences by removing, from at least one sentence of the set of high-quality sentences, at least one from among a bullet point and an emoji.

In some embodiments, the computer-implement method further includes, prior to the performing the post-processing, verifying the topic-specific content by extracting, from the topic-specific content, webpages corresponding to at least one from among a verified source domain, a verified publication, and a verified public source, to obtain the topic-specific content that is verified, where (d) is performed on the topic-specific content that is verified.

In some embodiments, each of the annotated data entries includes a raw content section and a sentences section where raw content of the raw content section is tokenized into sentences.

In some embodiments, the annotating further includes inserting tags in each of the annotated data entries, where the tags identify, for a corresponding webpage, the respective URL, the classification label for the URL, the target language, a target language confidence score, a webpage title, the raw content section, and the sentences section.

In some embodiments, the computer-implement method further outputting the result data as a model training dataset to be used as an input for training a speech recognition model.

In some embodiments, in the computer-implement method, (c) and (d) are performed for the plurality of topics, and the outputting the result data further includes providing sets of result data that are obtained according to each of the plurality of topics as a plurality of training datasets for building speech recognition models for the plurality of topics in the target language.

In some embodiments, in the computer-implement method, (c) and (d) are performed for the plurality of topics in the plurality of languages different from each other, and the outputting the result data further includes providing sets of result data that are obtained according to each of the plurality of topics in the plurality of languages as a plurality of training datasets for building speech recognition models in the plurality of languages according to the plurality of topics.

In some embodiments, the post-processing further includes performing the second filtering on the sentences of the topic-specific content to identify sentences according to a task-specific requirement.

In some embodiments, a first user selection input providing an identification of the target language is received prior to the annotating, and a second user selection input providing an identification of the topic for which (c) and (d) are to be performed is received prior to the first filtering.

In some embodiments, the computer-implement method further the first user selection input and the second user selection input are provided by a customer of a cloud service provider.

In various embodiments, a system is provided that includes one or more processors and one or more computer-readable media storing instructions which, when executed by the one or more processors, cause the system to perform part or all of the operations and/or methods disclosed herein.

In various embodiments, one or more non-transitory computer-readable media are provided for storing instructions which, when executed by one or more processors, cause a system to perform part or all of the operations and/or methods disclosed herein.

The techniques described above and below may be implemented in a number of ways and in a number of contexts. Several example implementations and contexts are provided with reference to the following figures, as described below in more detail. However, the following implementations and contexts are but a few of many.

BRIEF DESCRIPTION OF THE DRAWINGS

FIG. 4A is a simplified block diagram of a system in accordance with various embodiments.

FIG. 4B is an example of URL classification label in accordance with various embodiments.

FIG. 4C is an example of the annotated data entry in accordance with various embodiments.

FIG. 4D is an example of URLs containing locale information in accordance with various embodiments.

FIG. 5 is a simplified block diagram of a model training system in accordance with various embodiments.

FIG. 7 is an example of the list of sub-topics in accordance with various embodiments.

FIG. 8 is an example of the list of keywords in accordance with various embodiments.

DETAILED DESCRIPTION

Figure 1:
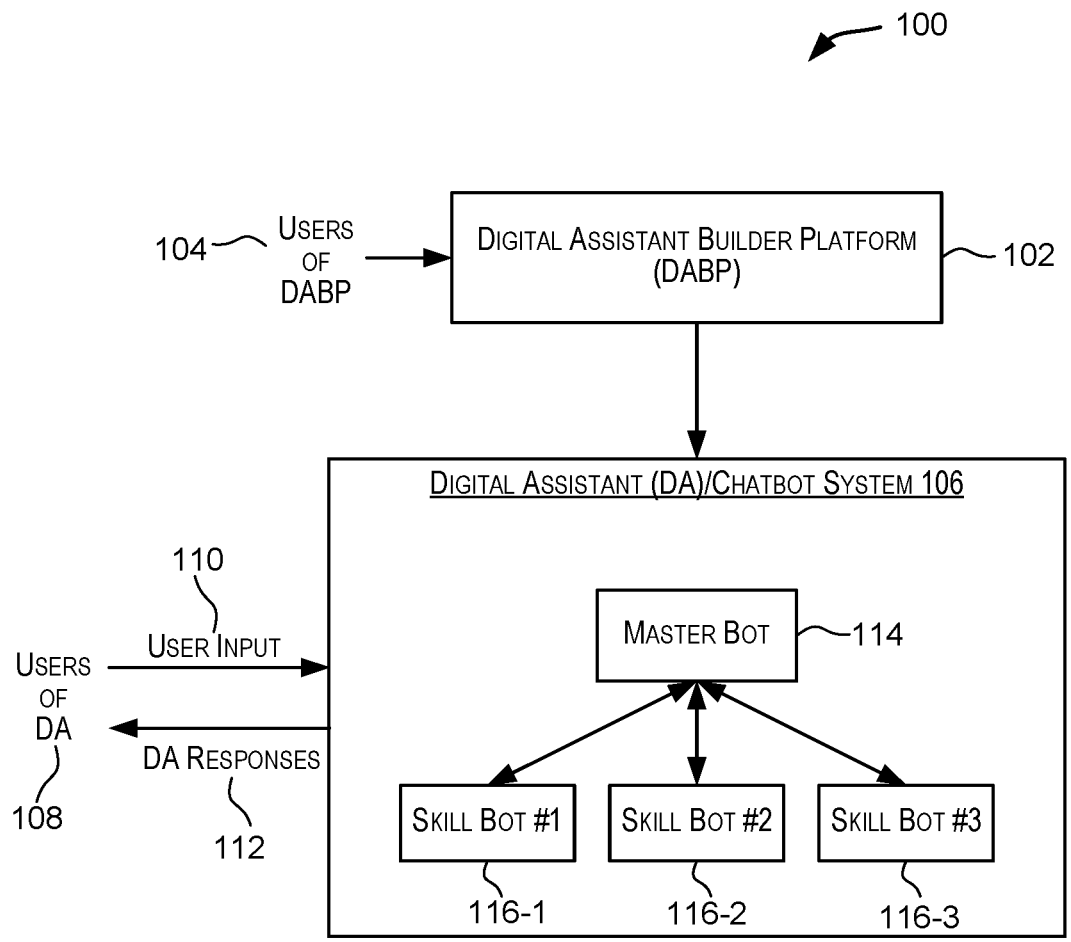
FIG. 1 is a simplified block diagram of a distributed environment in accordance with various embodiments.

In the following description, for the purposes of explanation, specific details are set forth in order to provide a thorough understanding of certain embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

Artificial intelligence has many applications. For example, a digital assistant is an artificial intelligence-driven interface that helps users accomplish a variety of tasks using natural language conversations. For each digital assistant, a customer may assemble one or more skills. Skills (also described herein as chatbots, bots, or skill bots) are individual bots that are focused on specific types of tasks, such as tracking inventory, submitting timecards, and creating expense reports. When an end user engages with the digital assistant, the digital assistant evaluates the end user input and routes the conversation to and from the appropriate chatbot. The digital assistant can be made available to end users through a variety of channels such as FACEBOOK® Messenger, SKYPE MOBILE® messenger, or a Short Message Service (SMS). Channels carry the chat back and forth from end users on various messaging platforms to the digital assistant and its various chatbots. The channels may also support user agent escalation, event-initiated conversations, and testing.

A model (e.g., a machine learning model) used to execute various tasks for the applications (e.g., a digital assistant) is typically trained with a large training dataset. The accuracy of machine learning models (e.g., automatic speech recognition (ASR) systems) is directly proportional to the quantity and quality of training data. Collecting a large amount of training data and making sure that it satisfies the task-specific requirements is a challenging, cost- and time-consuming process. In the related art, the collected data and utterances are selected randomly. However, there is a desire by user (e.g., customers) that the models be pre-trained on the specific data, e.g., a domain-specific data, a task-specific data, a locality-specific data, etc. As a part of the training, the model being trained learns a function that maps the inputs in the training data to their corresponding known outputs. After a model has been adequately trained using the training data, it can then be used for making output predictions for new inputs where the outputs are not known. This is often referred to as the inferencing phase.

Because the collected data and utterances are selected randomly in the related art, the training datasets of the related art might contain a small number of examples related to the selected topic or the selected task, and, as such, the training of the model might require several iterations for which the data and utterances are collected again, e.g., as a new training dataset. Collecting the data for the new training dataset results in inefficient use of the computational resources and the storage allocations. Additionally, the conventional systems and methods lack control over the collected data quality and accuracy. The users (e.g., developers) end up spending a significant amount of time to manually check and clean up errors in corpora vendor data deliveries prior to training their models. Further, conventional systems and methods cannot provide enough data in different languages according to various topics, to train natural language processing models (e.g., speech recognition models, named entity recognition, etc.) in different languages according to various topics.

To overcome these challenges and other, artificial intelligence-based techniques are described herein for obtaining, from a large text corpus, collections of sentences in different languages that are usable for training models in various applications of machine learning (e.g., chatbots) according to a predefined topic such as automobiles, healthcare, finance, entertainment, etc. In various embodiments, the machine learning models trained using collected data as described herein are implemented in a chatbot system, as described with respect to FIGS. 1, 2 and 3. Nonetheless, while the data collection techniques are described in various instances herein with particular reference to training machine learning models and/or a chatbot system, it should be understood that these techniques are applicable for other types of machine learning tasks and/or artificial-intelligence based systems where a developer/user is interested in large scale data collection.

In exemplary implementations, these data collection techniques are executed in one or more processing stages. In a first processing stage, input data may be obtained from a large text corpus, annotated, and output as annotated data, e.g., annotated data entries. The input data may be a web content in different languages according to different topics that is obtained from a large external dataset, e.g., Common Crawl. The language of each webpage is identified and the language confidence score for each webpage is computed. The webpages with the language confidence score lower than a predetermined threshold are considered to have a language whose identity is not sufficiently distinguishable and those webpages may be excluded from further processing. The webpages contain raw data that is tokenized into sentences. Also, each of the webpages is classified based on its URL into topical categories, and associated with corresponding classification label, e.g., a classification provided to each webpage to describe its category or sub-topic belonging to a bigger topic. For example, the URL categories are obtained from the public list "directory.mozilla.org" (DMOZ). Then, the classification label is inserted into the webpage and each webpage is annotated so that includes identification of its data portions. As such, the annotated data is generated according to one or more different languages and/or one or more different topics or tasks, where each of the webpages includes portions of content identified by tags (e.g., annotations) and the portions include, for example, the URL, the language identifier (ID), the language confidence score, the classification label of URL, raw content, and the tokenized sentences. Accordingly, the large data is generated in different languages and labeled based on the sub-topics of the topic where the URL of each webpage belongs.

In a second processing stage, the annotated data generated in the first processing stage may be filtered to obtain topic-specific content according to the target topic in the target language. The second processing stage includes one or more content filtering operations. In some embodiments, the annotated data may be filtered based on a list of sub-topics (e.g., categories) associated with the target topic, to obtain a large quantity of topic-specific content. For example, the sub-topics associated with the target topic are compared to the classification labels in the annotated data (e.g., annotated webpages), and the webpages whose classification labels correspond to the designated sub-topics are extracted. In this manner, the annotated data of a large text corpus is extensively mined, to collect data according to the sub-topics associated with the target topic, in the target language.

The second processing stage may also include a locality-based filtering that identifies the URLs of the webpages corresponding to a certain locality. This enables the detection of the data corresponding to a variation of a language, e.g., detection of the webpages in French Canadian by identifying ".ca" as the country code in the URLs.

The second processing stage may further include a regular expression (regex) based filtering, and the annotated data may be filtered based on a list of keywords or lexicons associated with the target topic. For example, the keywords associated with the target topic are compared to the words in the annotated data, and the sentences containing the keywords are extracted.

As a result of the processing performed by the second processing stage, a large quantity of the topic-specific content of high relevance to the user is generated.

In a third processing stage, the topic-specific content may be subjected to reliable-source filtering to maintain only those webpages that are from the reliable sources and the most likely in the target language. A list of reliable sources may be collected and ranked. The topic-specific content from the lower-ranked sources may be discarded. Further, as mentioned above, each annotated webpage contains the language confidence score that indicates a likelihood of the webpage being in a particular language. Although the lower-scored webpages are rejected at the first processing stage, the quality of the content may be further improved by the reliable-source filtering, by removing webpages based on a higher threshold, e.g., the webpage with the language confidence score lower than 99% may be rejected.

In a fourth processing stage, post-processing may be performed to finesse the sentences of the remaining topic-specific content. In certain implementations, the sentences are extracted from the topic-specific content and the flawed sentences are removed (e.g., incomplete sentences, sentences containing words in non-target language, etc.). Then, the remaining high-quality sentences are normalized, e.g., by removing from the sentences extraneous marks such as bullet points. The fourth processing stage may further include any other processing to identify sentences based on one or more task-specific requirements. For example, the high-quality sentences may be filtered to identify sentences for a sentiment analysis task where the sentences including a specific sentiment may be further selected.

As described above, a large quantity of the topic-specific content in different languages may be generated according to a designated target topic with high levels of accuracy. The generation of a large topic-specific dataset with improved accuracy results in efficient use of computational resources, thus improving the functioning of the computer system. Further, the large topic-specific datasets may be generated for a plurality of topics in a plurality of different languages and even in a plurality of language variations using the techniques described in this disclosure, allowing for efficiently extending the capabilities of the machine-learned models in different languages, as for example, natural language processing models (e.g., speech recognition, sentiment analysis, etc.). Additionally, the dataset generation may be appropriately controlled so that, for a designated target language, a certain sufficient amount of high-quality data is gathered for each of the topics of interest, allowing to provide a training dataset(s) for training machine learning model(s), e.g., natural language processing models, for the plurality of topics of interest with the consistent accuracy across the topics of interest, without the need for collecting additional training data.

In certain implementations, the novel data generation techniques described herein can be used by a CSP to provide services to its customers. For example, a customer may subscribe to a particular service (e.g., a chatbot service). As a part of the service, the CSP may provide one or more prebuilt models for that service that have been trained by the CSP using the collected data. For example, for the chatbot service, the prebuilt model may be trained to receive an utterance and identify a "general" topic class corresponding to the utterance, where the model is capable of making predictions at high levels of accuracy.

In certain implementations, the training techniques described herein themselves can be offered as a cloud service (e.g., a "dataset generation" service) by a CSP. The "dataset generation" service can be subscribed to by one or more customers of the CSP. For example, a subscribing customer may provide selections of the target language (or a target language variant) and the target topic(s). The CSP may, as a part of the service, generate a dataset in the target language (or a target language variant) according to the target topic.

Advantageously, the data collection techniques described herein provide better control over the content of the data and can align the content of the data to user's use cases. This may include coverage of different entity types across different domains and target languages/locales. Additionally, these data collection techniques can be used to guarantee conformance of the utterances with task-specific requirements. This will reduce the time and effort needed to integrate new data deliveries into a training pipeline. These data collection techniques can be seamlessly extended to satisfy any arbitrary properties. For example, data may be collected for any new target languages/locales without requiring personnel who understand the language. This will facilitate large-scale data collection for a wide variety of machine learning tasks.

Bot and Analytic Systems

A bot (also referred to as a skill, chatbot, chatterbot, or talkbot) is a computer program that can perform conversations with end users. The bot can generally respond to natural-language messages (e.g., questions or comments) through a messaging application that uses natural-language messages. Enterprises may use one or more bot systems to communicate with end users through a messaging application. The messaging application, which may be referred to as a channel, may be an end user preferred messaging application that the end user has already installed and familiar with. Thus, the end user does not need to download and install new applications in order to chat with the bot system. The messaging application may include, for example, over-the-top (OTT) messaging channels (such as Facebook Messenger, Facebook WhatsApp, WeChat, Line, Kik, Telegram, Talk, Skype, Slack, or SMS), virtual private assistants (such as Amazon Dot, Echo, or Show, Google Home, Apple HomePod, etc.), mobile and web app extensions that extend native or hybrid/responsive mobile apps or web applications with chat capabilities, or voice based input (such as devices or apps with interfaces that use Siri, Cortana, Google Voice, or other speech input for interaction).

In some examples, a bot system may be associated with a Uniform Resource Identifier (URI). The URI may identify the bot system using a string of characters. The URI may be used as a webhook for one or more messaging application systems. The URI may include, for example, a Uniform Resource Locator (URL) or a Uniform Resource Name (URN). The bot system may be designed to receive a message (e.g., a hypertext transfer protocol (HTTP) post call message) from a messaging application system. The HTTP post call message may be directed to the URI from the messaging application system. In some embodiments, the message may be different from a HTTP post call message. For example, the bot system may receive a message from a Short Message Service (SMS). While discussion herein may refer to communications that the bot system receives as a message, it should be understood that the message may be an HTTP post call message, a SMS message, or any other type of communication between two systems.

End users may interact with the bot system through a conversational interaction (sometimes referred to as a conversational user interface (UI)), just as interactions between people. In some cases, the interaction may include the end user saying "Hello" to the bot and the bot responding with a "Hi" and asking the end user how it can help. In some cases, the interaction may also be a transactional interaction with, for example, a banking bot, such as transferring money from one account to another; an informational interaction with, for example, a HR bot, such as checking for vacation balance; or an interaction with, for example, a retail bot, such as discussing returning purchased goods or seeking technical support.

In some embodiments, the bot system may intelligently handle end user interactions without interaction with an administrator or developer of the bot system. For example, an end user may send one or more messages to the bot system in order to achieve a desired goal. A message may include certain content, such as text, emojis, audio, image, video, or other method of conveying a message. In some embodiments, the bot system may convert the content into a standardized form (e.g., a representational state transfer (REST) call against enterprise services with the proper parameters) and generate a natural language response. The bot system may also prompt the end user for additional input parameters or request other additional information. In some embodiments, the bot system may also initiate communication with the end user, rather than passively responding to end user utterances. Described herein are various techniques for identifying an explicit invocation of a bot system and determining an input for the bot system being invoked. In certain embodiments, explicit invocation analysis is performed by a master bot based on detecting an invocation name in an utterance. In response to detection of the invocation name, the utterance may be refined for input to a skill bot associated with the invocation name.

A conversation with a bot may follow a specific conversation flow including multiple states. The flow may define what would happen next based on an input. In some embodiments, a state machine that includes user defined states (e.g., end user intents) and actions to take in the states or from state to state may be used to implement the bot system. A conversation may take different paths based on the end user input, which may impact the decision the bot makes for the flow. For example, at each state, based on the end user input or utterances, the bot may determine the end user's intent in order to determine the appropriate next action to take. As used herein and in the context of an utterance, the term "intent" refers to an intent of the user who provided the utterance. For example, the user may intend to engage a bot in conversation for ordering pizza, so that the user's intent could be represented through the utterance "Order pizza." A user intent can be directed to a particular task that the user wishes a chatbot to perform on behalf of the user. Therefore, utterances can be phrased as questions, commands, requests, and the like, that reflect the user's intent. An intent may include a goal that the end user would like to accomplish.

In the context of the configuration of a chatbot, the term "intent" is used herein to refer to configuration information for mapping a user's utterance to a specific task/action or category of task/action that the chatbot can perform. In order to distinguish between the intent of an utterance (i.e., a user intent) and the intent of a chatbot, the latter is sometimes referred to herein as a "bot intent." A bot intent may include a set of one or more utterances associated with the intent. For instance, an intent for ordering pizza can have various permutations of utterances that express a desire to place an order for pizza. These associated utterances can be used to train an intent classifier of the chatbot to enable the intent classifier to subsequently determine whether an input utterance from a user matches the order pizza intent. A bot intent may be associated with one or more dialog flows for starting a conversation with the user and in a certain state. For example, the first message for the order pizza intent could be the question "What kind of pizza would you like?" In addition to associated utterances, a bot intent may further include named entities that relate to the intent. For example, the order pizza intent could include variables or parameters used to perform the task of ordering pizza, e.g., topping 1, topping 2, pizza type, pizza size, pizza quantity, and the like. The value of an entity is typically obtained through conversing with the user.

FIG. 1 is a simplified block diagram of an environment 100 incorporating a chatbot system according to certain embodiments. Environment 100 includes a digital assistant builder platform (DABP) 102 that enables users of DABP 102 to create and deploy digital assistants or chatbot systems. DABP 102 can be used to create one or more digital assistants (or DAs) or chatbot systems. For example, as shown in FIG. 1, user 104 representing a particular enterprise can use DABP 102 to create and deploy a digital assistant 106 for users of the particular enterprise. For example, DABP 102 can be used by a bank to create one or more digital assistants for use by the bank's customers. The same DABP 102 platform can be used by multiple enterprises to create digital assistants. As another example, an owner of a restaurant (e.g., a pizza shop) may use DABP 102 to create and deploy a digital assistant that enables customers of the restaurant to order food (e.g., order pizza).

For purposes of this disclosure, a "digital assistant" is an entity that helps users of the digital assistant accomplish various tasks through natural language conversations. A digital assistant can be implemented using software only (e.g., the digital assistant is a digital entity implemented using programs, code, or instructions executable by one or more processors), using hardware, or using a combination of hardware and software. A digital assistant can be embodied or implemented in various physical systems or devices, such as in a computer, a mobile phone, a watch, an appliance, a vehicle, and the like. A digital assistant is also sometimes referred to as a chatbot system. Accordingly, for purposes of this disclosure, the terms digital assistant and chatbot system are interchangeable.

A digital assistant, such as digital assistant 106 built using DABP 102, can be used to perform various tasks via natural language-based conversations between the digital assistant and its users 108. As part of a conversation, a user may provide one or more user inputs 110 to digital assistant 106 and get responses 112 back from digital assistant 106. A conversation can include one or more of inputs 110 and responses 112. Via these conversations, a user can request one or more tasks to be performed by the digital assistant and, in response, the digital assistant is configured to perform the user-requested tasks and respond with appropriate responses to the user.

User inputs 110 are generally in a natural language form and are referred to as utterances. A user utterance 110 can be in text form, such as when a user types in a sentence, a question, a text fragment, or even a single word and provides it as input to digital assistant 106. In some embodiments, a user utterance 110 can be in audio input or speech form, such as when a user says or speaks something that is provided as input to digital assistant 106. The utterances are typically in a language spoken by the user 108. For example, the utterances may be in English, or some other language. When an utterance is in speech form, the speech input is converted to text form utterances in that particular language and the text utterances are then processed by digital assistant 106. Various speech-to-text processing techniques may be used to convert a speech or audio input to a text utterance, which is then processed by digital assistant 106. In some embodiments, the speech-to-text conversion may be done by digital assistant 106 itself.

An utterance, which may be a text utterance or a speech utterance, can be a fragment, a sentence, multiple sentences, one or more words, one or more questions, combinations of the aforementioned types, and the like. Digital assistant 106 is configured to apply natural language understanding (NLU) techniques to the utterance to understand the meaning of the user input. As part of the NLU processing for an utterance, digital assistant 106 is configured to perform processing to understand the meaning of the utterance, which involves identifying one or more intents and one or more entities corresponding to the utterance. Upon understanding the meaning of an utterance, digital assistant 106 may perform one or more actions or operations responsive to the understood meaning or intents. For purposes of this disclosure, it is assumed that the utterances are text utterances that have been provided directly by a user 108 of digital assistant 106 or are the results of conversion of input speech utterances to text form. This however is not intended to be limiting or restrictive in any manner.

For example, a user 108 input may request a pizza to be ordered by providing an utterance such as "I want to order a pizza." Upon receiving such an utterance, digital assistant 106 is configured to understand the meaning of the utterance and take appropriate actions. The appropriate actions may involve, for example, responding to the user with questions requesting user input on the type of pizza the user desires to order, the size of the pizza, any toppings for the pizza, and the like. The responses provided by digital assistant 106 may also be in natural language form and typically in the same language as the input utterance. As part of generating these responses, digital assistant 106 may perform natural language generation (NLG). For the user ordering a pizza, via the conversation between the user and digital assistant 106, the digital assistant may guide the user to provide all the requisite information for the pizza order, and then at the end of the conversation cause the pizza to be ordered. Digital assistant 106 may end the conversation by outputting information to the user indicating that the pizza has been ordered.

At a conceptual level, digital assistant 106 performs various processing in response to an utterance received from a user. In some embodiments, this processing involves a series or pipeline of processing steps including, for example, understanding the meaning of the input utterance (sometimes referred to as Natural Language Understanding (NLU)), determining an action to be performed in response to the utterance, where appropriate causing the action to be performed, generating a response to be output to the user responsive to the user utterance, outputting the response to the user, and the like. The NLU processing can include parsing the received input utterance to understand the structure and meaning of the utterance, refining and reforming the utterance to develop a better understandable form (e.g., logical form) or structure for the utterance. Generating a response may include using NLG techniques.

The NLU processing performed by a digital assistant, such as digital assistant 106, can include various Natural Language Processing (NLP) related processing such as sentence parsing (e.g., tokenizing, lemmatizing, identifying part-of-speech tags for the sentence, identifying named entities in the sentence, generating dependency trees to represent the sentence structure, splitting a sentence into clauses, analyzing individual clauses, resolving anaphoras, performing chunking, and the like). In certain embodiments, the NLU processing or portions thereof is performed by digital assistant 106 itself. In some other embodiments, digital assistant 106 may use other resources to perform portions of the NLU processing. For example, the syntax and structure of an input utterance sentence may be identified by processing the sentence using a parser, a part-of-speech tagger, and/or a named entity recognizer. In one implementation, for the English language, a parser, a part-of-speech tagger, and a named entity recognizer such as ones provided by the Stanford NLP Group are used for analyzing the sentence structure and syntax. These are provided as part of the Stanford CoreNLP toolkit.

While the various examples provided in this disclosure show utterances in the English language, this is meant only as an example. In certain embodiments, digital assistant 106 is also capable of handling utterances in languages other than English. Digital assistant 106 may provide subsystems (e.g., components implementing NLU functionality) that are configured for performing processing for different languages. These subsystems may be implemented as pluggable units that can be called using service calls from an NLU core server. This makes the NLU processing flexible and extensible for each language, including allowing different orders of processing. A language pack may be provided for individual languages, where a language pack can register a list of subsystems that can be served from the NLU core server.

A digital assistant, such as digital assistant 106 depicted in FIG. 1, can be made available or accessible to its users 108 through a variety of different channels, such as but not limited to, via certain applications, via social media platforms, via various messaging services and applications, and other applications or channels. A single digital assistant can have several channels configured for it so that it can be run on and be accessed by different services simultaneously.

A digital assistant or chatbot system generally contains or is associated with one or more skills. In certain embodiments, these skills are individual chatbots (referred to as skill bots) that are configured to interact with users and fulfill specific types of tasks, such as tracking inventory, submitting timecards, creating expense reports, ordering food, checking a bank account, making reservations, buying a widget, and the like. For example, for the embodiment depicted in FIG. 1, digital assistant or chatbot system 106 includes skills 116-1, 116-2, and so on. For purposes of this disclosure, the terms "skill" and "skills" are used synonymously with the terms "skill bot" and "skill bots," respectively.

Each skill associated with a digital assistant helps a user of the digital assistant complete a task through a conversation with the user, where the conversation can include a combination of text or audio inputs provided by the user and responses provided by the skill bots. These responses may be in the form of text or audio messages to the user and/or using simple user interface elements (e.g., select lists) that are presented to the user for the user to make selections.

There are various ways in which a skill or skill bot can be associated or added to a digital assistant. In some instances, a skill bot can be developed by an enterprise and then added to a digital assistant using DABP 102. In other instances, a skill bot can be developed and created using DABP 102 and then added to a digital assistant created using DABP 102. In yet other instances, DABP 102 provides an online digital store (referred to as a "skills store") that offers multiple skills directed to a wide range of tasks. The skills offered through the skills store may also expose various cloud services. In order to add a skill to a digital assistant being generated using DABP 102, a user of DABP 102 can access the skills store via DABP 102, select a desired skill, and indicate that the selected skill is to be added to the digital assistant created using DABP 102. A skill from the skills store can be added to a digital assistant as is or in a modified form (for example, a user of DABP 102 may select and clone a particular skill bot provided by the skills store, make customizations or modifications to the selected skill bot, and then add the modified skill bot to a digital assistant created using DABP 102).

Various different architectures may be used to implement a digital assistant or chatbot system. For example, in certain embodiments, the digital assistants created and deployed using DABP 102 may be implemented using a master bot/child(or sub) bot paradigm or architecture. According to this paradigm, a digital assistant is implemented as a master bot that interacts with one or more child bots that are skill bots. For example, in the embodiment depicted in FIG. 1, digital assistant 106 includes a master bot 114 and skill bots 116-1, 116-2, etc. that are child bots of master bot 114. In certain embodiments, digital assistant 106 is itself considered to act as the master bot.

A digital assistant implemented according to the master-child bot architecture enables users of the digital assistant to interact with multiple skills through a unified user interface, namely via the master bot. When a user engages with a digital assistant, the user input is received by the master bot. The master bot then performs processing to determine the meaning of the user input utterance. The master bot then determines whether the task requested by the user in the utterance can be handled by the master bot itself, else the master bot selects an appropriate skill bot for handling the user request and routes the conversation to the selected skill bot. This enables a user to converse with the digital assistant through a common single interface and still provide the capability to use several skill bots configured to perform specific tasks. For example, for a digital assistance developed for an enterprise, the master bot of the digital assistant may interface with skill bots with specific functionalities, such as a CRM bot for performing functions related to customer relationship management (CRM), an ERP bot for performing functions related to enterprise resource planning (ERP), an HCM bot for performing functions related to human capital management (HCM), etc. This way the end user or consumer of the digital assistant need only know how to access the digital assistant through the common master bot interface and behind the scenes multiple skill bots are provided for handling the user request.

In certain embodiments, in a master bot/child bots infrastructure, the master bot is configured to be aware of the available list of skill bots. The master bot may have access to metadata that identifies the various available skill bots, and for each skill bot, the capabilities of the skill bot including the tasks that can be performed by the skill bot. Upon receiving a user request in the form of an utterance, the master bot is configured to, from the multiple available skill bots, identify or predict a specific skill bot that can best serve or handle the user request. The master bot then routes the utterance (or a portion of the utterance) to that specific skill bot for further handling. Control thus flows from the master bot to the skill bots. The master bot can support multiple input and output channels. In certain embodiments, routing may be performed with the aid of processing performed by one or more available skill bots. For example, as discussed below, a skill bot can be trained to infer an intent for an utterance and to determine whether the inferred intent matches an intent with which the skill bot is configured. Thus, the routing performed by the master bot can involve the skill bot communicating to the master bot an indication of whether the skill bot has been configured with an intent suitable for handling the utterance.

While the embodiment in FIG. 1 shows digital assistant 106 including a master bot 114 and skill bots 116-1, 116-2, and 116-3, this is not intended to be limiting. A digital assistant can include various other components (e.g., other systems and subsystems) that provide the functionalities of the digital assistant. These systems and subsystems may be implemented only in software (e.g., code, instructions stored on a computer-readable medium and executable by one or more processors), in hardware only, or in implementations that use a combination of software and hardware.

DABP 102 provides an infrastructure and various services and features that enable a user of DABP 102 to create a digital assistant including one or more skill bots associated with the digital assistant. In some instances, a skill bot can be created by cloning an existing skill bot, for example, cloning a skill bot provided by the skills store. As previously indicated, DABP 102 provides a skills store or skills catalog that offers multiple skill bots for performing various tasks. A user of DABP 102 can clone a skill bot from the skills store. As needed, modifications or customizations may be made to the cloned skill bot. In some other instances, a user of DABP 102 created a skill bot from scratch using tools and services offered by DABP 102. As previously indicated, the skills store or skills catalog provided by DABP 102 may offer multiple skill bots for performing various tasks.

In certain embodiments, at a high level, creating or customizing a skill bot involves the following steps:
(1) Configuring settings for a new skill bot
(2) Configuring one or more intents for the skill bot
(3) Configuring one or more entities for one or more intents
(4) Training the skill bot
(5) Creating a dialog flow for the skill bot
(6) Adding custom components to the skill bot as needed
(7) Testing and deploying the skill bot
Each of the above steps is briefly described below.

(1) Configuring settings for a new skill bot—Various settings may be configured for the skill bot. For example, a skill bot designer can specify one or more invocation names for the skill bot being created. These invocation names can then be used by users of a digital assistant to explicitly invoke the skill bot. For example, a user can input an invocation name in the user's utterance to explicitly invoke the corresponding skill bot.

(2) Configuring one or more intents and associated example utterances for the skill bot—The skill bot designer specifies one or more intents (also referred to as bot intents) for a skill bot being created. The skill bot is then trained based upon these specified intents. These intents represent categories or classes that the skill bot is trained to infer for input utterances. Upon receiving an utterance, a trained skill bot infers an intent for the utterance, where the inferred intent is selected from the predefined set of intents used to train the skill bot. The skill bot then takes an appropriate action responsive to an utterance based upon the intent inferred for that utterance. In some instances, the intents for a skill bot represent tasks that the skill bot can perform for users of the digital assistant. Each intent is given an intent identifier or intent name. For example, for a skill bot trained for a bank, the intents specified for the skill bot may include "CheckBalance," "TransferMoney," "DepositCheck," and the like.

For each intent defined for a skill bot, the skill bot designer may also provide one or more example utterances that are representative of and illustrate the intent. These example utterances are meant to represent utterances that a user may input to the skill bot for that intent. For example, for the CheckBalance intent, example utterances may include "What's my savings account balance?", "How much is in my checking account?", "How much money do I have in my account," and the like. Accordingly, various permutations of typical user utterances may be specified as example utterances for an intent.

The intents and their associated example utterances are used as training data to train the skill bot. Various different training techniques may be used. As a result of this training, a predictive model is generated that is configured to take an utterance as input and output an intent inferred for the utterance by the predictive model. In some instances, input utterances are provided to an intent analysis engine, which is configured to use the trained model to predict or infer an intent for the input utterance. The skill bot may then take one or more actions based upon the inferred intent.

(3) Configuring entities for one or more intents of the skill bot—In some instances, additional context may be needed to enable the skill bot to properly respond to a user utterance. For example, there may be situations where a user input utterance resolves to the same intent in a skill bot. For instance, in the above example, utterances "What's my savings account balance?" and "How much is in my checking account?" both resolve to the same CheckBalance intent, but these utterances are different requests asking for different things. To clarify such requests, one or more entities are added to an intent. Using the banking skill bot example, an entity called AccountType, which defines values called "checking" and "saving" may enable the skill bot to parse the user request and respond appropriately. In the above example, while the utterances resolve to the same intent, the value associated with the AccountType entity is different for the two utterances. This enables the skill bot to perform possibly different actions for the two utterances in spite of them resolving to the same intent. One or more entities can be specified for certain intents configured for the skill bot. Entities are thus used to add context to the intent itself. Entities help describe an intent more fully and enable the skill bot to complete a user request.

In certain embodiments, there are two types of entities: (a) built-in entities provided by DABP 102, and (2) custom entities that can be specified by a skill bot designer. Built-in entities are generic entities that can be used with a wide variety of bots. Examples of built-in entities include, without limitation, entities related to time, date, addresses, numbers, email addresses, duration, recurring time periods, currencies, phone numbers, URLs, and the like. Custom entities are used for more customized applications. For example, for a banking skill, an AccountType entity may be defined by the skill bot designer that enables various banking transactions by checking the user input for keywords like checking, savings, and credit cards, etc.

(4) Training the skill bot—A skill bot is configured to receive user input in the form of utterances parse or otherwise process the received input, and identify or select an intent that is relevant to the received user input. As indicated above, the skill bot has to be trained for this. In certain embodiments, a skill bot is trained based upon the intents configured for the skill bot and the example utterances associated with the intents (collectively, the training data), so that the skill bot can resolve user input utterances to one of its configured intents. In certain embodiments, the skill bot uses a predictive model that is trained using the training data and allows the skill bot to discern what users say (or in some cases, are trying to say). DABP 102 provides various different training techniques that can be used by a skill bot designer to train a skill bot, including various machine learning based training techniques, rules-based training techniques, and/or combinations thereof. In certain embodiments, a portion (e.g., 80%) of the training data is used to train a skill bot model and another portion (e.g., the remaining 20%) is used to test or verify the model. Once trained, the trained model (also sometimes referred to as the trained skill bot) can then be used to handle and respond to user utterances. In certain cases, a user's utterance may be a question that requires only a single answer and no further conversation. In order to handle such situations, a Q&A (question-and-answer) intent may be defined for a skill bot. This enables a skill bot to output replies to user requests without having to update the dialog definition. Q&A intents are created in a similar manner as regular intents. The dialog flow for Q&A intents can be different from that for regular intents.

(5) Creating a dialog flow for the skill bot—A dialog flow specified for a skill bot describes how the skill bot reacts as different intents for the skill bot are resolved responsive to received user input. The dialog flow defines operations or actions that a skill bot will take, e.g., how the skill bot responds to user utterances, how the skill bot prompts users for input, how the skill bot returns data. A dialog flow is like a flowchart that is followed by the skill bot. The skill bot designer specifies a dialog flow using a language, such as markdown language. In certain embodiments, a version of YAML called OBotML may be used to specify a dialog flow for a skill bot. The dialog flow definition for a skill bot acts as a model for the conversation itself, one that lets the skill bot designer choreograph the interactions between a skill bot and the users that the skill bot services.

In certain embodiments, the dialog flow definition for a skill bot contains three sections:
 (a) a context section
 (b) a default transitions section
 (c) a states section Context section—The skill bot designer can define variables that are used in a conversation flow in the context section. Other variables that may be named in the context section include, without limitation: variables for error handling, variables for built-in or custom entities, user variables that enable the skill bot to recognize and persist user preferences, and the like.

Default transitions section—Transitions for a skill bot can be defined in the dialog flow states section or in the default transitions section. The transitions defined in the default transition section act as a fallback and get triggered when there are no applicable transitions defined within a state, or the conditions required to trigger a state transition cannot be met. The default transitions section can be used to define routing that allows the skill bot to gracefully handle unexpected user actions.

States section—A dialog flow and its related operations are defined as a sequence of transitory states, which manage the logic within the dialog flow. Each state node within a dialog flow definition names a component that provides the functionality needed at that point in the dialog. States are thus built around the components. A state contains component-specific properties and defines the transitions to other states that get triggered after the component executes.

Special case scenarios may be handled using the states sections. For example, there might be times when you want to provide users the option to temporarily leave a first skill they are engaged with to do something in a second skill within the digital assistant. For example, if a user is engaged in a conversation with a shopping skill (e.g., the user has made some selections for purchase), the user may want to jump to a banking skill (e.g., the user may want to ensure that he/she has enough money for the purchase), and then return to the shopping skill to complete the user's order. To address this, an action in the first skill can be configured to initiate an interaction with the second different skill in the same digital assistant and then return to the original flow.

(6) Adding custom components to the skill bot—As described above, states specified in a dialog flow for a skill bot name components that provide the functionality needed corresponding to the states. Components enable a skill bot to perform functions. In certain embodiments, DABP 102 provides a set of preconfigured components for performing a wide range of functions. A skill bot designer can select one of more of these preconfigured components and associate them with states in the dialog flow for a skill bot. The skill bot designer can also create custom or new components using tools provided by DABP 102 and associate the custom components with one or more states in the dialog flow for a skill bot.

(7) Testing and deploying the skill bot—DABP 102 provides several features that enable the skill bot designer to test a skill bot being developed. The skill bot can then be deployed and included in a digital assistant.

While the description above describes how to create a skill bot, similar techniques may also be used to create a digital assistant (or the master bot). At the master bot or digital assistant level, built-in system intents may be configured for the digital assistant. These built-in system intents are used to identify general tasks that the digital assistant itself (i.e., the master bot) can handle without invoking a skill bot associated with the digital assistant. Examples of system intents defined for a master bot include: (1) Exit: applies when the user signals the desire to exit the current conversation or context in the digital assistant; (2) Help: applies when the user asks for help or orientation; and (3) UnresolvedIntent: applies to user input that doesn't match well with the exit and help intents. The digital assistant also stores information about the one or more skill bots associated with the digital assistant. This information enables the master bot to select a particular skill bot for handling an utterance.

At the master bot or digital assistant level, when a user inputs a phrase or utterance to the digital assistant, the digital assistant is configured to perform processing to determine how to route the utterance and the related conversation. The digital assistant determines this using a routing model, which can be rules-based, AI-based, or a combination thereof. The digital assistant uses the routing model to determine whether the conversation corresponding to the user input utterance is to be routed to a particular skill for handling, is to be handled by the digital assistant or master bot itself per a built-in system intent, or is to be handled as a different state in a current conversation flow.

In certain embodiments, as part of this processing, the digital assistant determines if the user input utterance explicitly identifies a skill bot using its invocation name. If an invocation name is present in the user input, then it is treated as explicit invocation of the skill bot corresponding to the invocation name. In such a scenario, the digital assistant may route the user input to the explicitly invoked skill bot for further handling. If there is no specific or explicit invocation, in certain embodiments, the digital assistant evaluates the received user input utterance and computes confidence scores for the system intents and the skill bots associated with the digital assistant. The score computed for a skill bot or system intent represents how likely the user input is representative of a task that the skill bot is configured to perform or is representative of a system intent. Any system intent or skill bot with an associated computed confidence score exceeding a threshold value (e.g., a Confidence Threshold routing parameter) is selected as a candidate for further evaluation. The digital assistant then selects, from the identified candidates, a particular system intent or a skill bot for further handling of the user input utterance. In certain embodiments, after one or more skill bots are identified as candidates, the intents associated with those candidate skills are evaluated (according to the intent model for each skill) and confidence scores are determined for each intent. In general, any intent that has a confidence score exceeding a threshold value (e.g., 70%) is treated as a candidate intent. If a particular skill bot is selected, then the user utterance is routed to that skill bot for further processing. If a system intent is selected, then one or more actions are performed by the master bot itself according to the selected system intent.

Figure 2:
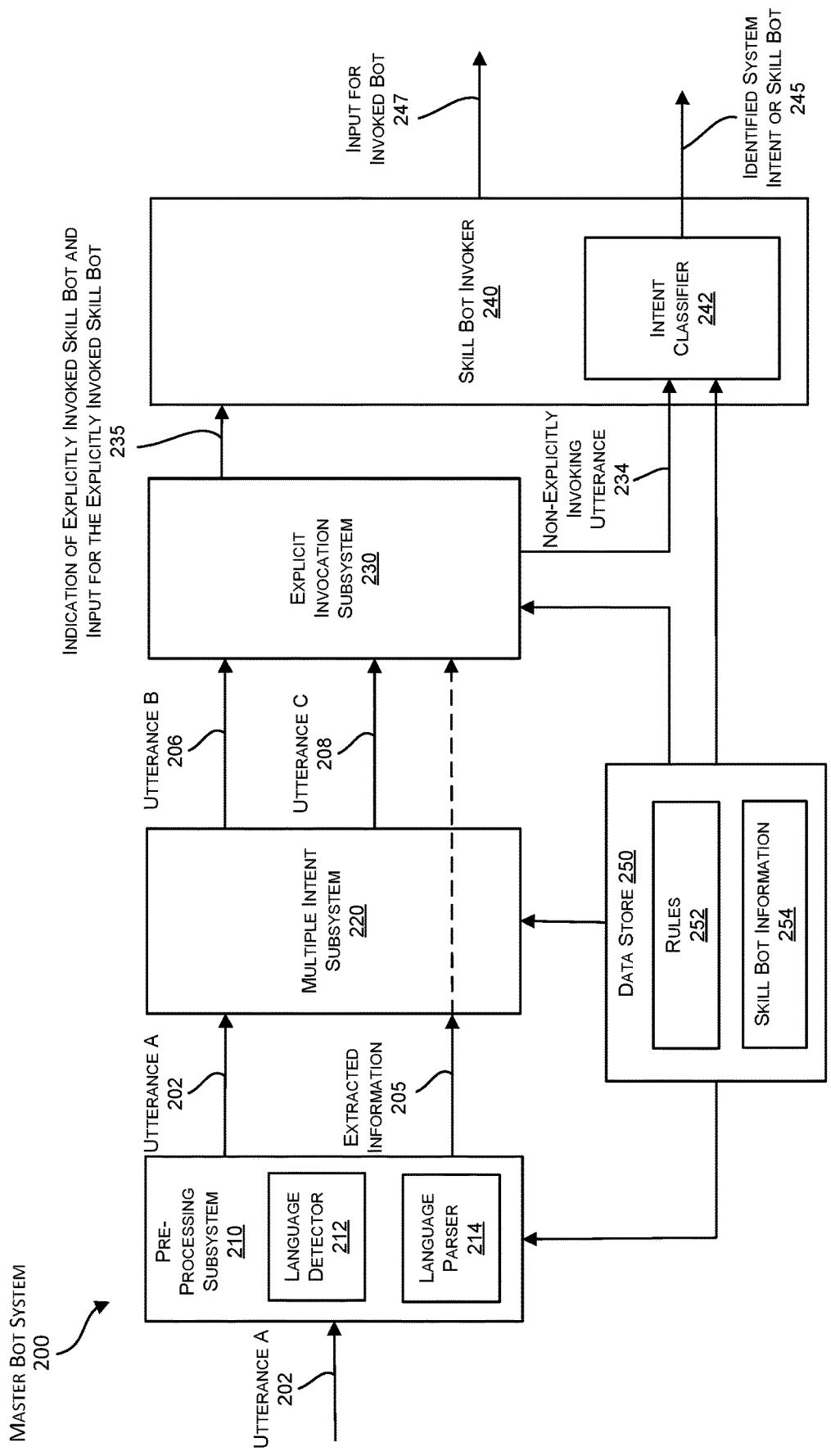
FIG. 2 is a simplified block diagram of a computing system implementing a master bot in accordance with various embodiments.

FIG. 2 is a simplified block diagram of a master bot (MB) system 200 according to certain embodiments. MB system 200 can be implemented in software only, hardware only, or a combination of hardware and software. MB system 200 includes a pre-processing subsystem 210, a multiple intent subsystem (MIS) 220, an explicit invocation subsystem (EIS) 230, a skill bot invoker 240, and a data store 250. MB system 200 depicted in FIG. 2 is merely an example of an arrangement of components in a master bot. One of ordinary skill in the art would recognize many possible variations, alternatives, and modifications. For example, in some implementations, MB system 200 may have more or fewer systems or components than those shown in FIG. 2, may combine two or more subsystems, or may have a different configuration or arrangement of subsystems.

Pre-processing subsystem 210 receives an utterance "A" 202 from a user and processes the utterance through a language detector 212 and a language parser 214. As indicated above, an utterance can be provided in various ways including audio or text. The utterance 202 can be a sentence fragment, a complete sentence, multiple sentences, and the like. Utterance 202 can include punctuation. For example, if the utterance 202 is provided as audio, the pre-processing subsystem 210 may convert the audio to text using a speech-to-text converter (not shown) that inserts punctuation marks into the resulting text, e.g., commas, semicolons, periods, etc.

Language detector 212 detects the language of the utterance 202 based on the text of the utterance 202. The manner in which the utterance 202 is handled depends on the language since each language has its own grammar and semantics. Differences between languages are taken into consideration when analyzing the syntax and structure of an utterance.

Language parser 214 parses the utterance 202 to extract part of speech (POS) tags for individual linguistic units (e.g., words) in the utterance 202. POS tags include, for example, noun (NN), pronoun (PN), verb (VB), and the like. Language parser 214 may also tokenize the linguistic units of the utterance 202 (e.g., to convert each word into a separate token) and lemmatize words. A lemma is the main form of a set of words as represented in a dictionary (e.g., "run" is the lemma for run, runs, ran, running, etc.). Other types of pre-processing that the language parser 214 can perform include chunking of compound expressions, e.g., combining "credit" and "card" into a single expression "credit_card." Language parser 214 may also identify relationships between the words in the utterance 202. For example, in some embodiments, the language parser 214 generates a dependency tree that indicates which part of the utterance (e.g. a particular noun) is a direct object, which part of the utterance is a preposition, and so on. The results of the processing performed by the language parser 214 form extracted information 205 and are provided as input to MIS 220 together with the utterance 202 itself.

As indicated above, the utterance 202 can include more than one sentence. For purposes of detecting multiple intents and explicit invocation, the utterance 202 can be treated as a single unit even if it includes multiple sentences. However, in certain embodiments, pre-processing can be performed, e.g., by the pre-processing subsystem 210, to identify a single sentence among multiple sentences for multiple intents analysis and explicit invocation analysis. In general, the results produced by MIS 220 and EIS 230 are substantially the same regardless of whether the utterance 202 is processed at the level of an individual sentence or as a single unit including multiple sentences.

Figure 3:
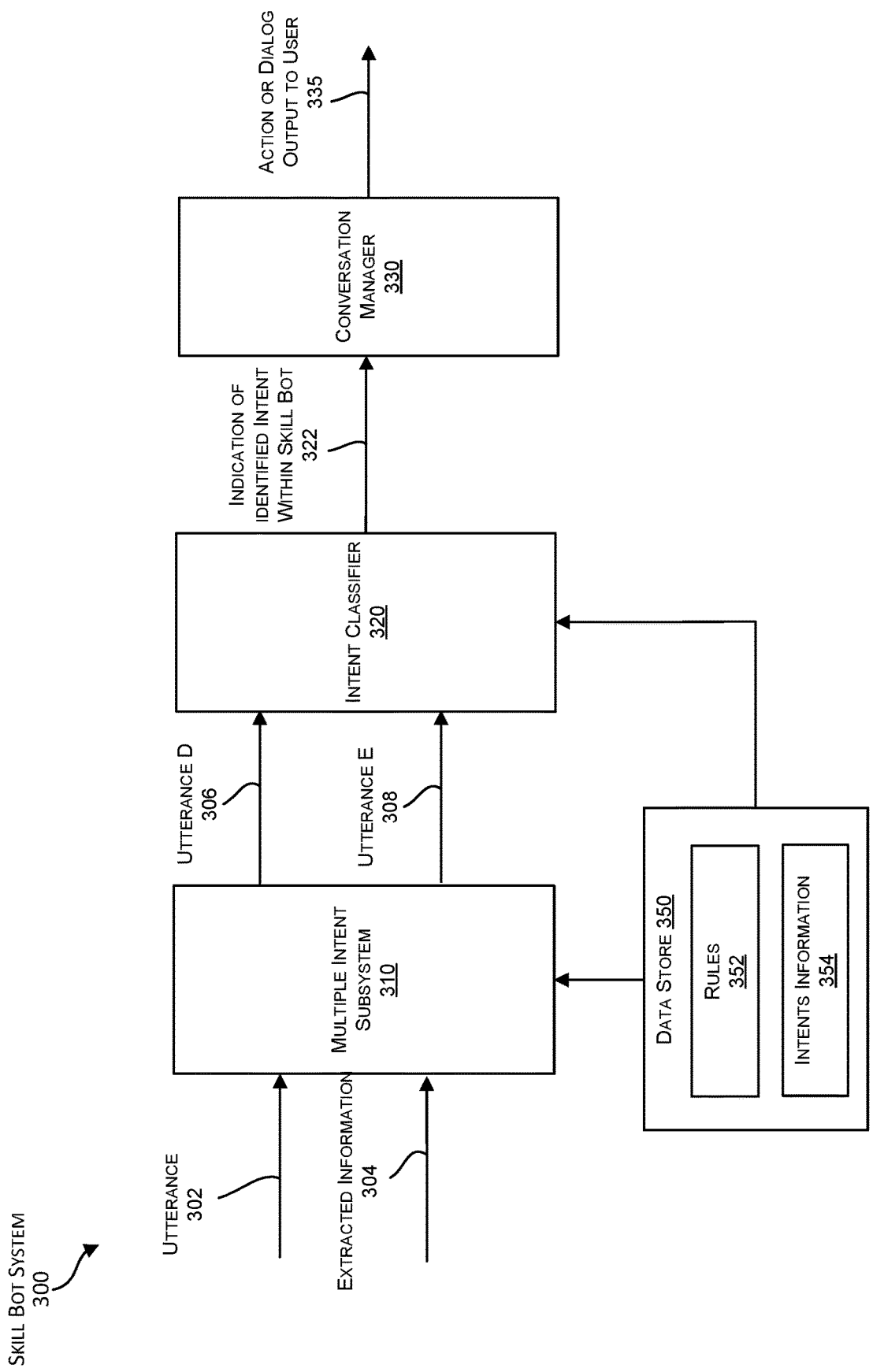
FIG. 3 is a simplified block diagram of a computing system implementing a skill bot in accordance with various embodiments.

MIS 220 determines whether the utterance 202 represents multiple intents. Although MIS 220 can detect the presence of multiple intents in the utterance 202, the processing performed by MIS 220 does not involve determining whether the intents of the utterance 202 match to any intents that have been configured for a bot. Instead, processing to determine whether an intent of the utterance 202 matches a bot intent can be performed by an intent classifier 242 of the MB system 200 or by an intent classifier of a skill bot (e.g., as shown in the embodiment of FIG. 3). The processing performed by MIS 220 assumes that there exists a bot (e.g., a particular skill bot or the master bot itself) that can handle the utterance 202. Therefore, the processing performed by MIS 220 does not require knowledge of what bots are in the chatbot system (e.g., the identities of skill bots registered with the master bot) or knowledge of what intents have been configured for a particular bot.

To determine that the utterance 202 includes multiple intents, the MIS 220 applies one or more rules from a set of rules 252 in the data store 250. The rules applied to the utterance 202 depend on the language of the utterance 202 and may include sentence patterns that indicate the presence of multiple intents. For example, a sentence pattern may include a coordinating conjunction that joins two parts (e.g., conjuncts) of a sentence, where both parts correspond to a separate intent. If the utterance 202 matches the sentence pattern, it can be inferred that the utterance 202 represents multiple intents. It should be noted that an utterance with multiple intents does not necessarily have different intents (e.g., intents directed to different bots or to different intents within the same bot). Instead, the utterance could have separate instances of the same intent, e.g. "Place a pizza order using payment account X, then place a pizza order using payment account Y."

As part of determining that the utterance 202 represents multiple intents, the MIS 220 also determines what portions of the utterance 202 are associated with each intent. MIS 220 constructs, for each intent represented in an utterance containing multiple intents, a new utterance for separate processing in place of the original utterance, e.g., an utterance "B" 206 and an utterance "C" 208, as depicted in FIG. 2. Thus, the original utterance 202 can be split into two or more separate utterances that are handled one at a time. MIS 220 determines, using the extracted information 205 and/or from analysis of the utterance 202 itself, which of the two or more utterances should be handled first. For example, MIS 220 may determine that the utterance 202 contains a marker word indicating that a particular intent should be handled first. The newly formed utterance corresponding to this particular intent (e.g., one of utterance 206 or utterance 208) will be the first to be sent for further processing by EIS 230. After a conversation triggered by the first utterance has ended (or has been temporarily suspended), the next highest priority utterance (e.g., the other one of utterance 206 or utterance 208) can then be sent to the EIS 230 for processing.

EIS 230 determines whether the utterance that it receives (e.g., utterance 206 or utterance 208) contains an invocation name of a skill bot. In certain embodiments, each skill bot in a chatbot system is assigned a unique invocation name that distinguishes the skill bot from other skill bots in the chatbot system. A list of invocation names can be maintained as part of skill bot information 254 in data store 250. An utterance is deemed to be an explicit invocation when the utterance contains a word match to an invocation name. If a bot is not explicitly invoked, then the utterance received by the EIS 230 is deemed a non-explicitly invoking utterance 234 and is input to an intent classifier (e.g., intent classifier 242) of the master bot to determine which bot to use for handling the utterance. In some instances, the intent classifier 242 will determine that the master bot should handle a non-explicitly invoking utterance. In other instances, the intent classifier 242 will determine a skill bot to route the utterance to for handling.

The explicit invocation functionality provided by the EIS 230 has several advantages. It can reduce the amount of processing that the master bot has to perform. For example, when there is an explicit invocation, the master bot may not have to do any intent classification analysis (e.g., using the intent classifier 242), or may have to do reduced intent classification analysis for selecting a skill bot. Thus, explicit invocation analysis may enable selection of a particular skill bot without resorting to intent classification analysis.

Also, there may be situations where there is an overlap in functionalities between multiple skill bots. This may happen, for example, if the intents handled by the two skill bots overlap or are very close to each other. In such a situation, it may be difficult for the master bot to identify which of the multiple skill bots to select based upon intent classification analysis alone. In such scenarios, the explicit invocation disambiguates the particular skill bot to be used.

In addition to determining that an utterance is an explicit invocation, the EIS 230 is responsible for determining whether any portion of the utterance should be used as input to the skill bot being explicitly invoked. In particular, EIS 230 can determine whether part of the utterance is not associated with the invocation. The EIS 230 can perform this determination through analysis of the utterance and/or analysis of the extracted information 205. EIS 230 can send the part of the utterance not associated with the invocation to the invoked skill bot in lieu of sending the entire utterance that was received by the EIS 230. In some instances, the input to the invoked skill bot is formed simply by removing any portion of the utterance associated with the invocation. For example, "I want to order pizza using Pizza Bot" can be shortened to "I want to order pizza" since "using Pizza Bot" is relevant to the invocation of the pizza bot, but irrelevant to any processing to be performed by the pizza bot. In some instances, EIS 230 may reformat the part to be sent to the invoked bot, e.g., to form a complete sentence. Thus, the EIS 230 determines not only that there is an explicit invocation, but also what to send to the skill bot when there is an explicit invocation. In some instances, there may not be any text to input to the bot being invoked. For example, if the utterance was "Pizza Bot", then the EIS 230 could determine that the pizza bot is being invoked, but there is no text to be processed by the pizza bot. In such scenarios, the EIS 230 may indicate to the skill bot invoker 240 that there is nothing to send.

Skill bot invoker 240 invokes a skill bot in various ways. For instance, skill bot invoker 240 can invoke a bot in response to receiving an indication 235 that a particular skill bot has been selected as a result of an explicit invocation. The indication 235 can be sent by the EIS 230 together with the input for the explicitly invoked skill bot. In this scenario, the skill bot invoker 240 will turn control of the conversation over to the explicitly invoked skill bot. The explicitly invoked skill bot will determine an appropriate response to the input from the EIS 230 by treating the input as a stand-alone utterance. For example, the response could be to perform a specific action or to start a new conversation in a particular state, where the initial state of the new conversation depends on the input sent from the EIS 230.

Another way in which skill bot invoker 240 can invoke a skill bot is through implicit invocation using the intent classifier 242. The intent classifier 242 can be trained, using machine learning and/or rules-based training techniques, to determine a likelihood that an utterance is representative of a task that a particular skill bot is configured to perform. The intent classifier 242 is trained on different classes, one class for each skill bot. For instance, whenever a new skill bot is registered with the master bot, a list of example utterances associated with the new skill bot can be used to train the intent classifier 242 to determine a likelihood that a particular utterance is representative of a task that the new skill bot can perform. The parameters produced as result of this training (e.g., a set of values for parameters of a machine learning model) can be stored as part of skill bot information 254.

In certain embodiments, the intent classifier 242 is implemented using a machine learning model, as described in further detail herein. Training of the machine learning model may involve inputting at least a subset of utterances from the example utterances associated with various skill bots to generate, as an output of the machine learning model, inferences as to which bot is the correct bot for handling any particular training utterance. For each training utterance, an indication of the correct bot to use for the training utterance may be provided as ground truth information. The behavior of the machine learning model can then be adapted (e.g., through back-propagation) to minimize the difference between the generated inferences and the ground truth information.

In certain embodiments, the intent classifier 242 determines, for each skill bot registered with the master bot, a confidence score indicating a likelihood that the skill bot can handle an utterance (e.g., the non-explicitly invoking utterance 234 received from EIS 230). The intent classifier 242 may also determine a confidence score for each system level intent (e.g., help, exit) that has been configured. If a particular confidence score meets one or more conditions, then the skill bot invoker 240 will invoke the bot associated with the particular confidence score. For example, a threshold confidence score value may need to be met. Thus, an output 245 of the intent classifier 242 is either an identification of a system intent or an identification of a particular skill bot. In some embodiments, in addition to meeting a threshold confidence score value, the confidence score must exceed the next highest confidence score by a certain win margin. Imposing such a condition would enable routing to a particular skill bot when the confidence scores of multiple skill bots each exceed the threshold confidence score value.

After identifying a bot based on evaluation of confidence scores, the skill bot invoker 240 hands over processing to the identified bot. In the case of a system intent, the identified bot is the master bot. Otherwise, the identified bot is a skill bot. Further, the skill bot invoker 240 will determine what to provide as input 247 for the identified bot. As indicated above, in the case of an explicit invocation, the input 247 can be based on a part of an utterance that is not associated with the invocation, or the input 247 can be nothing (e.g., an empty string). In the case of an implicit invocation, the input 247 can be the entire utterance.

Data store 250 includes one or more computing devices that store data used by the various subsystems of the master bot system 200. As explained above, the data store 250 includes rules 252 and skill bot information 254. The rules 252 include, for example, rules for determining, by MIS 220, when an utterance represents multiple intents and how to split an utterance that represents multiple intents. The rules 252 further include rules for determining, by EIS 230, which parts of an utterance that explicitly invokes a skill bot to send to the skill bot. The skill bot information 254 includes invocation names of skill bots in the chatbot system, e.g., a list of the invocation names of all skill bots registered with a particular master bot. The skill bot information 254 can also include information used by intent classifier 242 to determine a confidence score for each skill bot in the chatbot system, e.g., parameters of a machine learning model.

FIG. 3 is a simplified block diagram of a skill bot system 300 according to certain embodiments. Skill bot system 300 is a computing system that can be implemented in software only, hardware only, or a combination of hardware and software. In certain embodiments such as the embodiment depicted in FIG. 1, skill bot system 300 can be used to implement one or more skill bots within a digital assistant.

Skill bot system 300 includes an MIS 310, an intent classifier 320, and a conversation manager 330. The MIS 310 is analogous to the MIS 220 in FIG. 2 and provides similar functionality, including being operable to determine, using rules 352 in a data store 350: (1) whether an utterance represents multiple intents and, if so, (2) how to split the utterance into a separate utterance for each intent of the multiple intents. In certain embodiments, the rules applied by MIS 310 for detecting multiple intents and for splitting an utterance are the same as those applied by MIS 220. The MIS 310 receives an utterance 302 and extracted information 304. The extracted information 304 is analogous to the extracted information 205 in FIG. 1 and can be generated using the language parser 214 or a language parser local to the skill bot system 300.

Intent classifier 320 can be trained in a similar manner to the intent classifier 242 discussed above in connection with the embodiment of FIG. 2 and as described in further detail herein. For instance, in certain embodiments, the intent classifier 320 is implemented using a machine learning model. The machine learning model of the intent classifier 320 is trained for a particular skill bot, using at least a subset of example utterances associated with that particular skill bot as training utterances. The ground truth for each training utterance would be the particular bot intent associated with the training utterance.

The utterance 302 can be received directly from the user or supplied through a master bot. When the utterance 302 is supplied through a master bot, e.g., as a result of processing through MIS 220 and EIS 230 in the embodiment depicted in FIG. 2, the MIS 310 can be bypassed so as to avoid repeating processing already performed by MIS 220. However, if the utterance 302 is received directly from the user, e.g., during a conversation that occurs after routing to a skill bot, then MIS 310 can process the utterance 302 to determine whether the utterance 302 represents multiple intents. If so, then MIS 310 applies one or more rules to split the utterance 302 into a separate utterance for each intent, e.g., an utterance "D" 306 and an utterance "E" 308. If utterance 302 does not represent multiple intents, then MIS 310 forwards the utterance 302 to intent classifier 320 for intent classification and without splitting the utterance 302.

Intent classifier 320 is configured to match a received utterance (e.g., utterance 306 or 308) to an intent associated with skill bot system 300. As explained above, a skill bot can be configured with one or more intents, each intent including at least one example utterance that is associated with the intent and used for training a classifier. In the embodiment of FIG. 2, the intent classifier 242 of the master bot system 200 is trained to determine confidence scores for individual skill bots and confidence scores for system intents. Similarly, intent classifier 320 can be trained to determine a confidence score for each intent associated with the skill bot system 300. Whereas the classification performed by intent classifier 242 is at the bot level, the classification performed by intent classifier 320 is at the intent level and therefore finer grained. The intent classifier 320 has access to intents information 354. The intents information 354 includes, for each intent associated with the skill bot system 300, a list of utterances that are representative of and illustrate the meaning of the intent and are typically associated with a task performable by that intent. The intents information 354 can further include parameters produced as a result of training on this list of utterances.

Conversation manager 330 receives, as an output of intent classifier 320, an indication 322 of a particular intent, identified by the intent classifier 320, as best matching the utterance that was input to the intent classifier 320. In some instances, the intent classifier 320 is unable to determine any match. For example, the confidence scores computed by the intent classifier 320 could fall below a threshold confidence score value if the utterance is directed to a system intent or an intent of a different skill bot. When this occurs, the skill bot system 300 may refer the utterance to the master bot for handling, e.g., to route to a different skill bot. However, if the intent classifier 320 is successful in identifying an intent within the skill bot, then the conversation manager 330 will initiate a conversation with the user.

The conversation initiated by the conversation manager 330 is a conversation specific to the intent identified by the intent classifier 320. For instance, the conversation manager 330 may be implemented using a state machine configured to execute a dialog flow for the identified intent. The state machine can include a default starting state (e.g., for when the intent is invoked without any additional input) and one or more additional states, where each state has associated with it actions to be performed by the skill bot (e.g., executing a purchase transaction) and/or dialog (e.g., questions, responses) to be presented to the user. Thus, the conversation manager 330 can determine an action/dialog 335 upon receiving the indication 322 identifying the intent, and can determine additional actions or dialog in response to subsequent utterances received during the conversation.

Data store 350 includes one or more computing devices that store data used by the various subsystems of the skill bot system 300. As depicted in FIG. 3, the data store 350 includes the rules 352 and the intents information 354. In certain embodiments, data store 350 can be integrated into a data store of a master bot or digital assistant, e.g., the data store 250 in FIG. 2.

Exemplary Data Collecting System and Methods

FIG. 4A is a simplified block diagram of a dataset generation system 400 according to various embodiments. The dataset generation system 400 may be implemented using one or more computer systems, each computer system having one or more processors. The dataset generation system 400 may include multiple components and subsystems communicatively coupled to each other via one or more communication mechanisms. For example, in the embodiment depicted in FIG. 4A, the dataset generation system 400 includes a data mining subsystem 402, a filtering subsystem 404, a results ranking subsystem 406, and a post-processing subsystem 408. These subsystems may be implemented as one or more computer systems. The systems, subsystems, and other components depicted in FIG. 4A may be implemented in software (e.g., code, instructions, program) executed by one or more processing units (e.g., processors, cores) of the respective systems, using hardware, or combinations thereof. The software may be stored on a non-transitory storage medium (e.g., on a memory device). The dataset generation system 400 depicted in FIG. 4A is merely an example and is not intended to unduly limit the scope of embodiments. Many variations, alternatives, and modifications are possible. For example, in some implementations, the dataset generation system 400 may have more or fewer subsystems or components than those shown in FIG. 4A, may combine two or more subsystems, or may have a different configuration or arrangement of subsystems. The dataset generation system 400 and subsystems depicted in FIG. 4A may be implemented using one or more computer systems, such as the computer system depicted in FIG. 13.

The dataset generation system 400 is configured to perform multi-stage processing on input data obtained from a large text corpus, and output a plurality of various datasets that could be used for various purposes. The input data may be in a plurality of different languages in a plurality of topics. The dataset generation system 400 performs processing on the input data and outputs a plurality of datasets including the processed data obtained based on the input data and classified by a language and/or a specific topic. As an example, the plurality of datasets may be used to train natural language processing models (e.g., speech recognition models) in different languages. As another example, the plurality of datasets may be generated and labeled for a specific topic, e.g., a health topic or an auto topic, and may be used for building a specific pre-trained model for a health industry customer or an auto industry customer.

Further, domain-specific data (e.g., healthcare, finance, etc.) may be used for domain adaptation of natural language processing models, which have already been pre-trained on large amount of general textual data, and securing a high accuracy for the target dataset (e.g., customer use case, for example, healthcare domain) that is substantially different from the source dataset (e.g., the dataset used to pre-train the model). As another example, the plurality of datasets may be used to improve the accuracy of the related art natural language processing models, e.g., the neural-based models that require a great amount of data. As yet another example, the plurality of datasets may be used to train a wide variety of natural language processing tasks by adding a task-specific filtering layer to make sure that the collected data satisfies given task-specific requirements, e.g., named entity recognition (NER), sentiment analysis, etc. For instance, to train a named entity recognition model, the mined sentences can be further filtered using a related art named entity recognition model or using regular expressions to select sentences containing the desired entities (e.g., TIME, DATE, etc.). For training a sentiment analysis model, the collected sentences can be further filtered based on sentiment-related attributes that make a specific product (e.g., vehicle, electronic device) desirable or undesirable (e.g., categorizing the sentences into positive, negative or neutral classes) using the related art sentiment analysis model.

In certain implementations, the plurality of datasets may be used to build a set of parallel, language-specific sentiment-labeling models for a particular domain, in a wide variety of languages. As another example, the novel techniques may be used to gather data for new models in at least one axis among a language axis and a domain axis. For example, the data is collected to build a model for scanning English media feeds to detect scandal gossip about Hollywood celebrities. The novel techniques can be used to gather similar Hindi data to perform the similar detection for Bollywood celebrities, thereby performing an extension in the language axis. As another example, the model may be leveraged into a different domain, such as detecting real estate transactions by those same celebrities instead, thereby performing extension in the domain axis. As yet another example, both axes may be extended, resulting in a matrix of models specialized for each combination of language and domain.

In some implementations, the multi-stage processing performed by the dataset generation system 400 includes four stages that are performed by the data mining subsystem 402, the filtering subsystem 404, the results ranking subsystem 406, and the post-processing subsystem 408, respectively. Each of these stages and the functions performed by these subsystems are described below in more detail.

The data mining subsystem 402 is configured to perform the processing corresponding to the first processing stage. The data mining subsystem 402 obtains, as an input, input data from a large text corpus, and performs the processing on the input data that results in a generation of the annotated data, e.g., annotated data entries. The annotated data is output by the data mining subsystem 402 and then used as an input for the second processing stage performed by the filtering subsystem 404.

In some implementations, the input data may be a web content obtained from a large external dataset, e.g., Common Crawl that is an open repository of data accumulated by crawling the web, as known to those skilled in the art.

However, this is not intended to be limiting, and, in some implementations, the input data may be obtained from other source or sources or may be a mix of data from Common Crawl and other sources.

Common Crawl is a massive non-curated dataset of webpages in many languages, mixed together in temporal snapshots of the web. Every month, Common Crawl releases a snapshot of the web obtained by randomly exploring and sampling URLs. Presently, the complete archive consists of petabytes of data collected over many years of web crawling. The webpages are crawled from the entire web without restriction; they come in many different languages and the quality of the text varies greatly.

In certain implementations, the data mining subsystem 402 includes a language detector 420, a sentence tokenizer 422, an URL classifier 423, and an annotator 426. The language detector 420 may receive, as input data, the web content, identify the language of the webpages, and output a language identifier (ID) and a language confidence score for each webpage. As an example, the language detector 420 may use a language detecting model, e.g., a classification model, which provides an identification of the languages and computes a language confidence score for the most probable language for each webpage. The language detecting model may be a neural network model. In some implementations, the webpages with the language confidence score lower than a predetermined threshold may be omitted from further processing. The language confidence score is a value from 0 to 1, and the predetermined threshold may be variably set, e.g., to 0.95. For example, the webpages with the language confidence score of 0.95 or higher are classified as being in the corresponding language. The webpages with the language confidence score lower than 0.95 are considered to have a language whose identity is not sufficiently distinguishable and those webpages are excluded from further processing. In some embodiments, as a result of the processing performed by the language detector 420, the webpages may be identified and/or grouped by the language.

The sentence tokenizer 422 tokenizes the input data into sentences, using for example, a neural network model. For example, the sentence tokenizer 422 uses one or more neural network models to process the input data of one or more languages, based on the language ID associated with the corresponding webpage.

The URL classifier 423 classifies an URL of corresponding webpages into topical categories, and associates the URL with classification labels, e.g., classifications provided to each webpage to describe its category or sub-topic belonging to a bigger topic. In some implementations, web topic information is looked up in a database to determine a corresponding URL category. For example, the URL categories are obtained from the public list DMOZ. Alternatively, another public URL database provides the URL categories. Alternatively, a commercially available URL database is the source for URL categories.

However, this is not intended to be limiting, and, in some implementations, the URL categories may be obtained via other methods, e.g., by applying an URL classification model on the URLs of the webpages. The URL classification model may be a neural network model.

FIG. 4B depicts an example 425 of a source domain (e.g., an URL), "amazon.com," with classification information that classifies the source domain into different categories, e.g., sub-domains or sub-topics. As shown in FIG. 4B, "amazon.com" may be classified as:

"Top/Shopping/Entertainment"
"Top/Shopping/General_Merchandise/Major_Retailers"
"Top/Regional/North_America/United_States/Washington/Localities/S/Seattle/Business_and_Economy/Shopping/Books"

Referring again to FIG. 4A, the annotator 426 receives the input data, the language ID, the language confidence score for the webpages, the URL classification labels from the URL classifier 423, and the tokenized sentences, and outputs the annotated data entries. For example, for each data entry of the input data, e.g., a webpage, the annotator assembles predetermined data that includes inserting the URL classification labels obtained by the URL classifier 423 into corresponding webpages. The annotator 426 provides annotations to the predetermined data so that the annotated data entry identifies, for a corresponding webpage, portions of the predetermined data, e.g., an URL, classification (e.g., an URL classification) determined by the URL classifier 425, a language, a language confidence score, a webpage title, raw data of the webpage, and the tokenized sentences into which the raw data is tokenized by the sentence tokenizer 422.

FIG. 4C depicts an example of the annotated webpage 430, e.g., the annotated data entry, where the tags identify portions of the predetermined data. A tag "URL" identifies a text 432 describing the URL. A tag "classification" points to a classification label 434, e.g., a classification of the URL that is determined by the URL classifier 425 and inserted into the annotated data entry. The classification label 434 provides a topic category, e.g., a sub-topic, to which the URL belongs. In some implementations, the category and/or subcategory of the webpage is provided by DMOZ classifications. A tag "language" corresponds to the language ID 436 of the webpage, e.g., "en" (English). A tag "language score" identifies a language confidence score for the webpage, e.g., 0.95. A tag "title" points to the title of the content corresponding to the URL. A tag "raw_content" identifies a raw content section containing raw data 438. A tag "sentences" identifies sentences section containing sentences 439 into which the raw data or raw content is tokenized by the sentence tokenizer 422.

As shown in FIG. 4A, the dataset generation system 400 also includes a storage subsystem 440 that may store the various data constructs and programs used by the dataset generation system 400. For example, the storage subsystem 440 may store various databases such as an annotated data database 441 and one or more topic databases 442.

However, this is not intended to be limiting. In alternative implementations, the annotated data database 441 and one or more topic databases 442 may be stored in other memory storage locations (e.g., different databases) that are accessible to the dataset generation system 400, where these memory storage locations can be local to or remote from the dataset generation system 400. In addition, various other data used by the dataset generation system 400 or generated by the dataset generation system 400 as a part of its functioning may be stored in the storage subsystem 440.

In some embodiments, the annotated data obtained by the data mining subsystem 402 are provided to the annotated data database 441 where the annotated data may be grouped and stored as a plurality of annotated datasets 443 to 444 according to different languages based on the annotations provided by the annotator 426.

However, the described-above is not intended to be limiting. In certain implementations, the storing of annotated data in the annotated data database 441 is omitted. Further, in some implementations, the processing described above is performed for a specific target language. For example, after the language detector 420 identifies the language of the webpages, the further processing is performed for the target language identified, for example, by a user command provided by a user device 446.

The sentence tokenizer 422 tokenizes the input data of the target language into sentences using one or more neural network models to process the input data of the webpages in the target language, based on the language ID associated with the corresponding webpage. The URL classifier 423 classifies an URL of corresponding webpages into topical categories, and associates the URL with classification labels, as described above, except that the processing is performed on the webpages in the target language only. The annotator 426 receives the input data in the target language, the language ID, the language confidence score for the webpages in the target language, the URL classification labels for the webpages in the target language, and the tokenized sentences for the webpages in the target language, and outputs the annotated data entries for the webpages in the target language. The operations of the annotator 426 and the substance of the annotated data entries are described above.

As a result of the processing performed by the data mining subsystem 402, the annotated webpages are generated and may be used to generate data according to one or more different languages and/or one or more different topics or tasks.

The filtering subsystem 404 is configured to perform the processing according to the second processing stage. For example, the filtering subsystem 404 may perform a first filtering.

In embodiments, the filtering subsystem 404 receives, as an input, the annotated data entries from the data mining subsystem 402, performs predetermined filtering on the annotated data entries, and outputs a topic-specific content of the target topic in the target language. The topic-specific content is used as an input for the third processing stage performed by the results ranking subsystem 406.

However, the described-above is not intended to be limiting, and the annotated data entries may be obtained from the annotated data database 441.

In an example depicted in FIG. 4A, the selections of the target language and the target topic are received from the user device 446. This affords the user more control over the processing performed at the first processing stage and/or the second processing stage. For example, in the cloud environment, the target language and the target topic can be set by the CSP or a customer subscribing to a cloud service provided by the CSP where the generation of the dataset for training the model is performed as a part of the service. The user's inputs may be received through a user interface (UI) 448, e.g., a graphical UI, a button, a keyboard input, etc.

The processing, e.g., the first filtering, performed by the filtering subsystem 404 includes one or more content filtering operations, for example, a classification label based filtering, a regular expression (regex) based filtering, and/or a locality based filtering. In some embodiments, the filtering subsystem 404 includes a classification label based filter 450 that receives, as inputs, the annotated data entries corresponding to the target language, and sub-topics (e.g., categories) corresponding to the target topic, from one or more topic databases 442. For example, the topic database 442 may store a set of topics. The topics may include auto & vehicles, health, art, etc., as noted above. An example of the topic database 442 is described below with reference to FIG. 6. The topic database 442 stores a list 458 of sub-topics associated with corresponding topics. The topic database 442 further stores a list 460 of lexicons, e.g., keywords, associated with corresponding topics. For example, if the target topic is health, the sub-topics may include children's health, dentistry, treatments, etc., and the lexicons may include vocabulary associated with the health, such as the names of medications and/or various diseases. For example, the topics are classified by the sub-topics based on a same classification system as the classification of the URLs of the webpages of the input data. The list 458 of sub-topics and the list 460 of lexicons are described in detail below with reference to FIGS. 6-8.

The classification label based filter 450 extracts, from the received annotated data entries, the topic-specific content corresponding to the target topic, by matching, e.g., comparing, sub-topics that are associated with the target topic in the list 458 of sub-topics with the classification labels in the annotated data entries. As a result of the processing performed by the classification label based filter 450, the topic-specific content is obtained that includes tokenized sentences in the target language corresponding to the sub-topics associated with the target topic.

In certain implementations, the filtering subsystem 404 further includes a regex based filter 461. The regex based filter 461 receives, as inputs, the annotated data entries corresponding to the target language and the lexicons corresponding to the target topic from the list 460 of lexicons. The regex based filter 461 extracts, from the annotated data entries, the tokenized sentences corresponding to the lexicons, by matching, i.e., comparing, the lexicons that are associated with the target topic in the list 460 of lexicons with the words in the sentences. As a result of the processing performed by the regex based filter 461 on the annotated data entries, lexicon-selective sentences may be obtained and joined with the topic-specific content, to maximize the collected data and output topic-specific, lexicon-specific content. Duplicative sentences may be removed by further filtering.

In some implementations, the regex based filter 461 performs processing based on the topic-specific content generated by the classification label based filter 450 instead of an entire annotated data generated by the data mining subsystem 402 for the target language. In these implementations, the regex based filter 461 may extract, from the topic-specific content, the tokenized sentences corresponding to the lexicons, by matching, e.g., comparing, the lexicons that are associated with the target topic in the list 460 of lexicons with the words in the sentences of the topic-specific content. As a result of such processing, more focused topic-specific content may be obtained, e.g., topic-specific, lexicon-specific content.

However, the described-above is not intended to be limiting, and, in some implementations, the regex based filter 461 may be omitted.

In certain embodiments, the filtering subsystem 404 may further include a locality based filter 462, to detect data corresponding to a variation of the target language, e.g., Canadian French, Taiwanese Mandarin, British English, etc. For example, the user may provide an input through the user device 446, to activate the locality based filter 462, and also may provide an input identifying the geographic locality and/or the variation of the language.

In some embodiments, the locality based filter 462 receives, as an input, the topic-specific content obtained based on the processing performed by the classification label based filter 450 and the regex based filter 461, and outputs the topic-specific variation-specific data satisfying the locality condition. The locality based filter 462 filters the topic-specific content based on, for example, the local information of the URLs of the webpages obtained by the classification label based filter 450, where the local information of the URLs identifies the locality corresponding to the variation in the language. The locality based filter 462 discards the webpages whose URL does not contain the specified local information. Further, the locality based filter 462 refers to the URLs of the webpages where the sentences containing the topic-specific lexicons were detected by the regex based filter 461 and performs filtering to remove the sentences obtained by the regex based filter 461 from the webpages that do not satisfy the locality condition. Accordingly, the locality based filter 462 may remove the content that does not satisfy the locality condition, by performing filtering based on the local information of the URLs of the webpages.

In some embodiments, the locality based filter 462 may be applied first and then the regex based filter 461 may be applied. The locality based filter 462 receives, as an input, the topic-specific content obtained by the classification label based filter 450 and filters the topic-specific content based on, for example, the local information of the URLs of the webpages, where the local information of the URLs identifies the locality corresponding to the variation in the language. Accordingly, the locality based filter 462 may remove the content that does not satisfy the locality condition, by referring to the local information of the URLs of the webpages. The regex based filter 461 may be then applied to extract, from the locality-based data, the tokenized sentences corresponding to the topic-specific lexicons in the language variant. As a result, lexicon-specific content that is also topic-specific, variation-specific content may be obtained.

FIG. 4D depicts an example 464 of the URLs having locale information, e.g., ".ca" as the country code. Assuming that the dataset generation system 400 performs processing for French, as the target language, and the user input is received to activate the locality based filter 462 to obtain only the webpages containing Canadian French, the locality based filter 462 extracts the webpages whose URLs contain ".ca" as the country code. In embodiments, the webpages corresponding to English URLs and non-English URLs are considered for data collection.

As a result of the processing performed by the filtering subsystem 404 (e.g., first filtering), the topic-specific content of high relevance to the user is generated and provided, as an input, to the results ranking subsystem 406.

The results ranking subsystem 406 is configured to perform the processing according to the third processing stage. The results ranking subsystem 406 receives, as an input, the topic-specific content from the filtering subsystem 404, performs verification on the topic-specific content, and outputs the verified topic-specific content of the target topic in the target language. The verified topic-specific content is used as an input for the fourth processing stage performed by the post-processing subsystem 408.

However, the described-above is not intended to be limiting, and the third processing stage processing may be omitted or some or all of the processing at the third processing stage may be performed by the filtering subsystem 404 or by the post-processing subsystem 408.

In some embodiments, the results ranking subsystem 406 may include a website-based ranker 466 for ranking the website content and a language score ranker 468 for ranking the language. However, this is not intended to be limiting. In certain implementations, the results ranking subsystem 406 can perform ranking based on the different criteria or additional criteria. For example, the ranking can be performed based on metrics derived from arbitrary analysis of the content itself. E.g., a percentage of domain-relevant keywords in the content can be calculated and the ranking can be performed on that basis.

The website-based ranker 466 receives, as an input, the topic-specific content from the filtering subsystem 404, ranks the webpages of the topic-specific content based on one or more sources, and filters the topic-specific content, e.g., removes content obtained from the unreliable sources by discarding the webpages obtained from the source(s) having a ranking lower than a ranking threshold. In certain implementations, the website-based ranker 466 ranks the topic-specific content based on ranking of reliable sources for the target language. In some embodiments, the storage subsystem 440 stores a ranked collection of reliable sources for one or more different languages. The reliable sources may include lists of magazines and newspapers published in particular countries that are obtained by querying a reliable source such as Wikipedia. For example, the reliable sources may be obtained based on a query of a user. The query may specify to obtain a list of magazines and newspapers in French that are published in Canada. The hyperlinks may be extracted to create a list of magazines and newspapers published in Canadian French.

Alternately or additionally, the collection of reliable sources may include a list of reliable domains, e.g., top level domains such as .org, .edu, .gov, .net, etc., and/or a list of reliable public sources, e.g., Wikipedia, BBC, CNN, etc. For example, each of the reliable sources may have a ranking or a group of reliable sources may have a ranking. For example, a magazine/newspaper group may be given a ranking of 3, a domain group (e.g., .org, .edu, .gov, and .net) may be given a ranking of 2, and a public source group may be given a ranking of 1. All other sources may be given a ranking of 0.

Depending on the use case, the website-based ranker 466 may remove content obtained from the unreliable source by discarding the webpages obtained from the source(s) having a ranking lower than, for example, 3, 2, or 1. That is, the ranking threshold may be variably set based on the use case. For example, the dataset generation system 400 may set the ranking threshold to 3 for the high resource languages (e.g., when a great number of sentences is collected) or for the use cases where a smaller number of utterances is required. In some embodiments, the ranking threshold may be set by a user input through the user device 446.

The language score ranker 468 may further filter the topic-specific content to remove the webpages with a low language confidence score, for example, the webpages annotated with the language confidence score below a predetermined threshold, e.g., 0.99.

However, the described-above is not intended to be limiting, and the processing performed by the website-based ranker 466 and/or the language score ranker 468 may be omitted, based on the target language and/or the use case. For example, the website-based ranker 466 and/or the language score ranker 468 may be utilized for the high resource languages and/or for the use cases where a smaller number of utterances is required.

As a result of the processing performed by the results ranking subsystem 406, a verified topic-specific content is obtained and provided, as an input, to the post-processing subsystem 408.

The post-processing subsystem 408 is configured to perform the processing according to the fourth processing stage. For example, the post-processing subsystem 408 may perform at least one from among a second filtering and a normalizing.

In embodiments, the post-processing subsystem 408 receives, as an input, the verified topic-specific content from the results ranking subsystem 406 (or the topic-specific content from the filtering subsystem 404 if the processing of the third processing stage is omitted), extracts from the topic-specific content sentences, performs post-processing on the extracted sentences, and outputs the result data of the target topic in the sentences of the target language. The result data is provided to a model training system to generate machine learning models, e.g., natural language processing models such as speech recognition models, according to the target topic in the target language.

In some implementations, the post-processing subsystem 408 includes a quality checker 472 and a normalizer 474. The quality checker 472 applies, to the extracted sentences, filtering (e.g., second filtering) to remove flawed sentences, and outputs sentences of a high quality. For example, the quality checker 472 removes sentences incorrectly structured, unstructured sentences, incomplete sentences (e.g., a cut-off sentence, a single word, a clause, or a group of words that do not represent a complete sentence), grammatically incorrect sentences, sentences including titles, fragmented sentences, sentences having out of range length (e.g., too short or too long), and/or sentences containing foreign words, e.g., words in a non-target language. In certain implementations, the quality checker 472 uses an auto language detection model to make sure that each of the sentences is in the target language and does not contain any foreign words. The auto language detection model may be a neural network model.

A normalizer 474 receives, as an input, the sentences of the high quality and applies filtering to, for example, remove emojis and/or bullet points from the sentences, normalize the punctuation marks, and/or remove sentences having tokens with repetitive vowels (e.g., "whaaaaaat").

However, this is not intended to be limiting, and the processing performed by the post-processing subsystem 408 may further additionally or alternatively include any other processing, e.g., a sentiment analysis where the sentences including a specific sentiment may be further selected. For instance, users can further filter the sentences using sentiment-related attributes that make a specific product (e.g., vehicle, electronic device) desirable or undesirable to users using an existing sentiment analysis model. This way, they can add another layer of filtering by labeling domain-specific sentences (e.g., computer and electronics domain) as positive, negative or neutral as follows:

- "I really like the new design of Canon Printer!" → Positive
- "Apple is expected to introduce the iPhone 14 models at an event that's likely to be held in September 2022." → Neutral
- "The new app can be really glitchy and is definitely not user friendly!" → Negative In embodiments, any additional layer of filtering performed by the post-processing subsystem 408 may be referred to as a second filtering.

As a result of the processing performed by the post-processing subsystem 408, the result data of the high quality is output according to various sub-topics of the target topic in the sentences of the target language.

For example, the result data is output as one or more datasets 480. In an example shown in FIG. 4A, the datasets 480 are organized by the target language and the target topic, but this is not intended to be limiting. The datasets may be output in any order and be of any number, based on a request of a user, for example.

FIG. 5 is a simplified block diagram of a model training system 500 according to various embodiments. In an example, a customer user may provide a request to train a speech recognition model in a first language according to a first topic. Based on the request of the customer user, the model training system 500 receives, as an input, a model to be trained, and a dataset 502 generated by the dataset generation system 400 that contains high quality sentences according to the first topic and the first language. The model training system 500 trains the model using the received dataset, and generates the trained model according to the first topic and the first language. For example, the generated trained model is a speech recognition model that can be used in a first chatbot service in the first language.

In another example, a customer user may provide a request to train a speech recognition model in a second language according to a second topic. Based on the request of the customer user, the model training system 500 receives, as an input, a model to be trained, and a dataset 504 generated by the dataset generation system 400 that contains high quality sentences according to the second topic and the second language. The model training system 500 trains the model using the received dataset, and generates the trained model according to the second topic and the second language. For example, the generated trained model is a speech recognition model that can be used in a second chatbot service in the second language.

Figure 6:
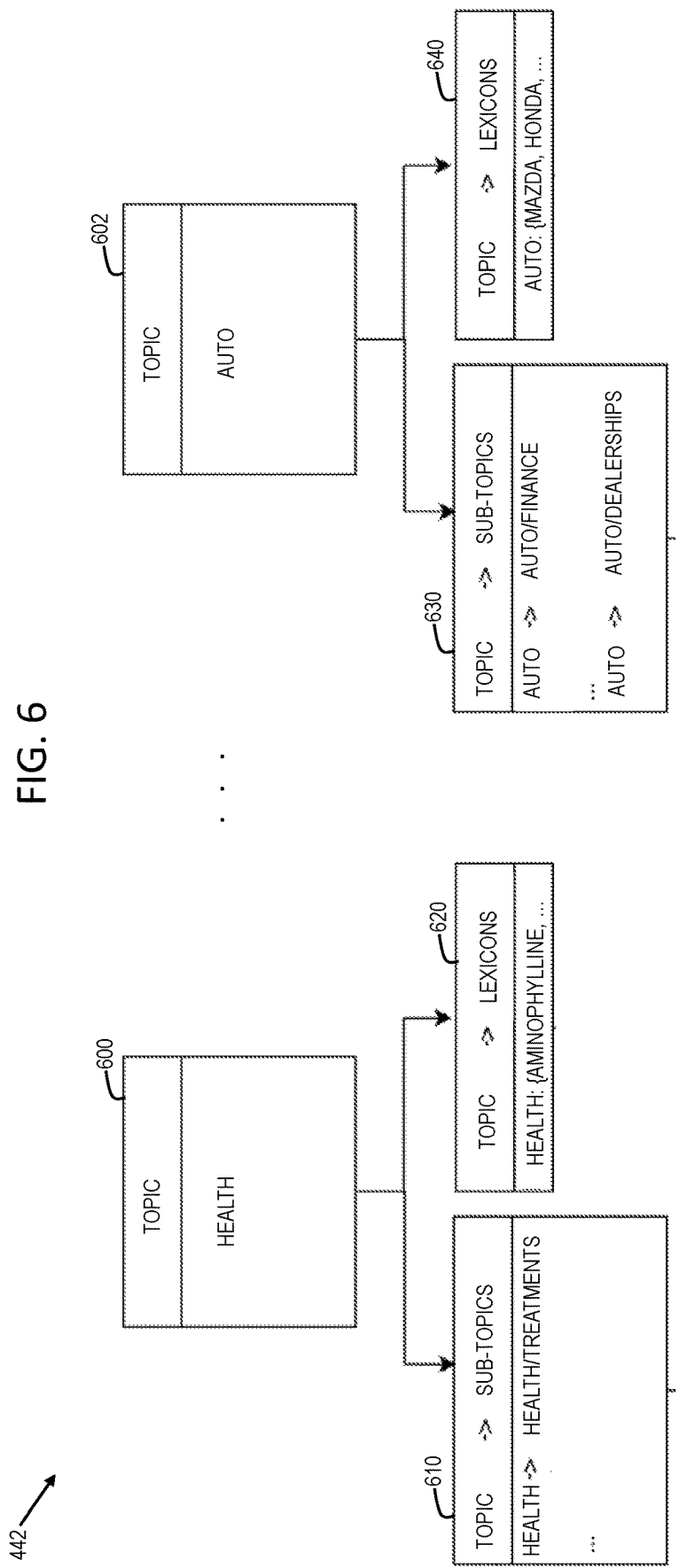
FIG. 6 is an example of the topic database in accordance with various embodiments.

FIG. 6 depicts an example of the topic database 442. The topic database 442 includes a list of topics, e.g., a topic 600 to a topic 602 that may correspond to the topics selected by a user or to the topics available as a general knowledge to those skilled in the art. As exemplary depicted in FIG. 6, the topic 600 is health, and the topic 602 is auto.

Each of the topics in the topic list is associated with related sub-topics, e.g., classifications, and lexicons. For example, the topic 600 ("Health") is associated with related sub-topics in a list 610 of sub-topics, and with related lexicons in a list 620 of lexicons. The topic 602 ("Auto") is associated with related sub-topics in a list 630 of sub-topics, and with related lexicons in a list 640 of lexicons. The lists 610, 630 of sub-topics may correspond to the list 458 of sub-topics described above with reference to FIG. 4A. The lists 620, 640 of lexicons may correspond to the list 460 of lexicons described above with reference to FIG. 4A. However, the described-above is not limiting and each of the topics with associated sub-topics and lexicons may be stored in separate databases.

FIG. 7 depicts an example of the list 700 of sub-topics corresponding to the health and medical topics, and FIG. 8 depicts an example of the list 800 of keywords (e.g., lexicons) corresponding to the health and medical topics.

In certain embodiments, the dataset generation system 400 may perform the processing for several topics that together constitute the target topic, based on the user input. For example, the user input may provide a selection of the health topic. Because the health topic is related to the medical topic, the dataset generation system 400 may determine to perform the processing for the health and medical topics as the target topic. The sub-topics associated with the health topic and sub-topics associated with the medical topic may overlap or may be complementary. The dataset generation system 400 may retrieve, from the topic database 442, sub-topics associated with the health topic and sub-topics associated with the medical topic, process the retrieved sub-topics to remove the duplicates, and provide the sub-topics associated with the health and medical topics, as the list 700 of sub-topics, to the filtering subsystem 404.

Likewise, the dataset generation system 400 may retrieve, from the topic database 442, lexicons associated with the health topic and lexicons associated with the medical topic, process the retrieved lexicons to remove the duplicates, and provide the lexicons associated with the health and medical topics, as the list 800 of lexicons, to the filtering subsystem 404.

As shown in FIG. 8, as a non-limiting example, the lexicons, e.g., keywords, associated with the health topic and the medical topic include medications (shown in the left column of the list 800) and diseases (shown in the right column of the list 800).

Figure 9:
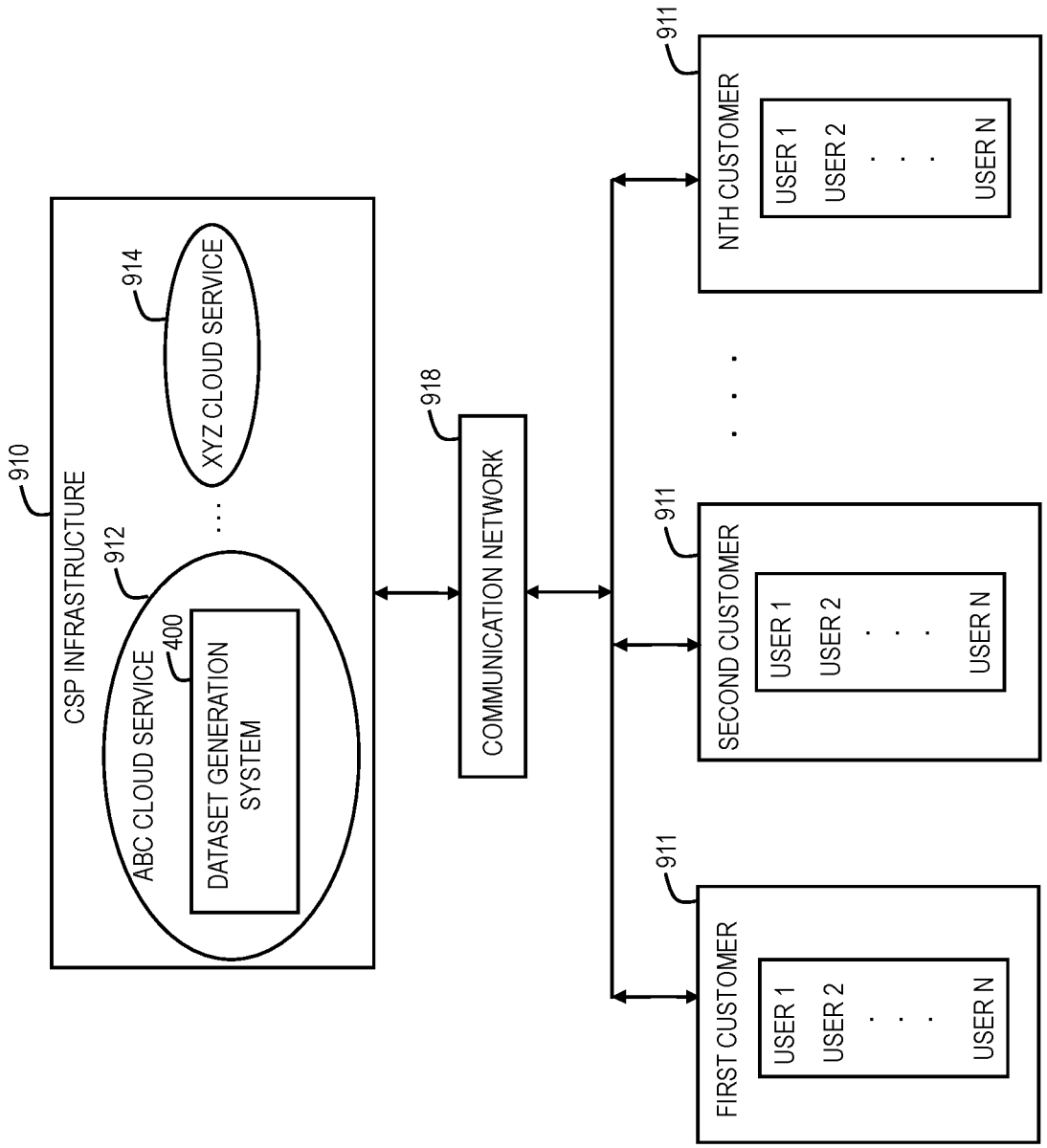
FIG. 9 is a simplified block diagram of a system in a cloud service provider (CSP) infrastructure in accordance with various embodiments.

FIG. 9 is a simplified block diagram of a system in a cloud service provider (CSP) infrastructure according to an embodiment.

Figure 11:
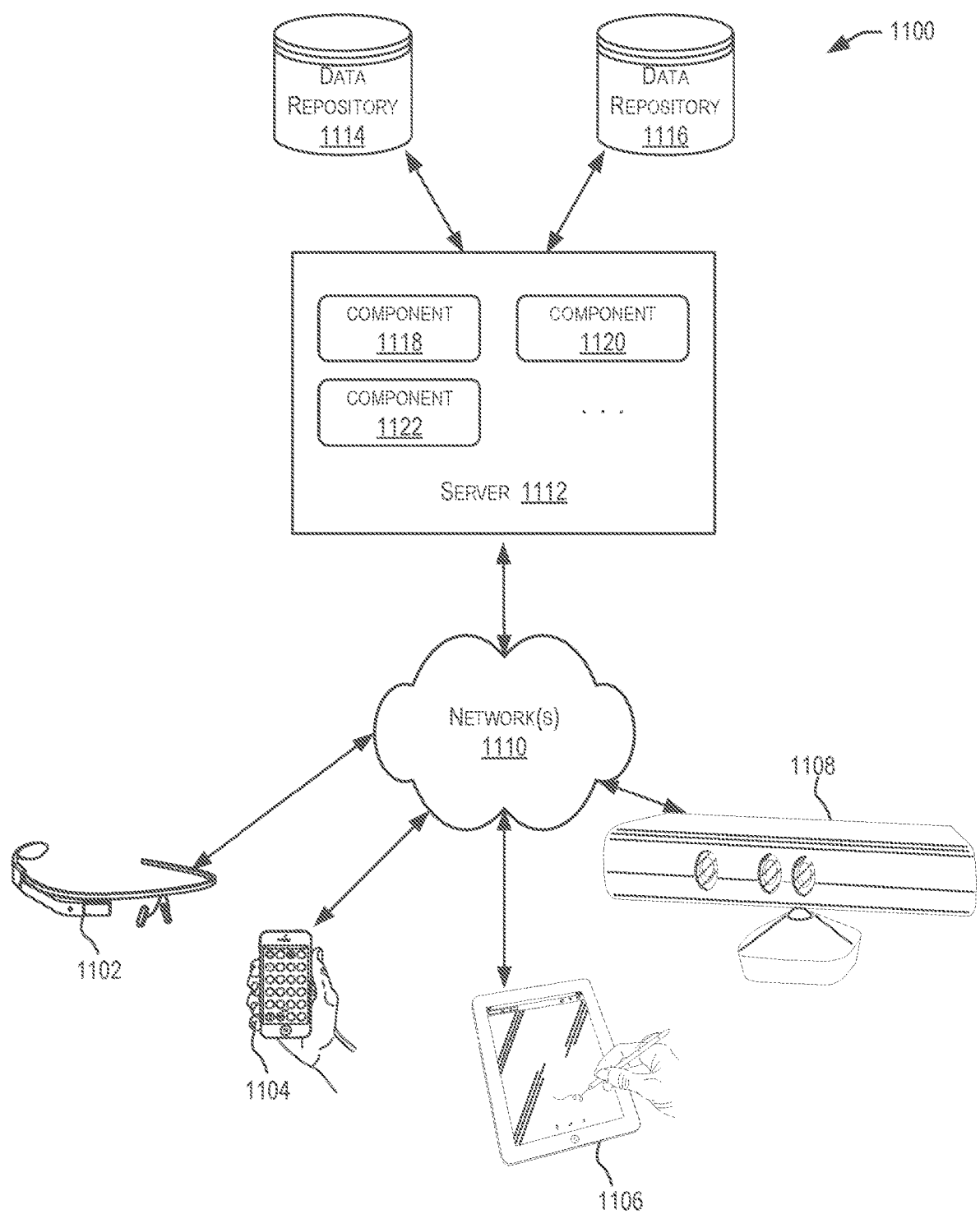
FIG. 11 depicts a simplified diagram of a distributed system for implementing various embodiments.

As shown in FIG. 9, the dataset generation system 400 may be a part of a CSP infrastructure 910 provided by a CSP for providing one or more cloud services to one or more customer computers, e.g., customers 911. For example, the CSP infrastructure 910 may support a plurality of cloud services including an ABC cloud service 912 to an XYZ cloud service 914, where the dataset generation system 400 for generating a plurality of datasets may be provided as a part of one of the plurality of cloud services, e.g., the ABC cloud service 912. The CSP infrastructure 910 is connected to the customer computers via a communication network 918. More detailed example of cloud infrastructure architecture is depicted in FIG. 11 and described below.

Figure 10:
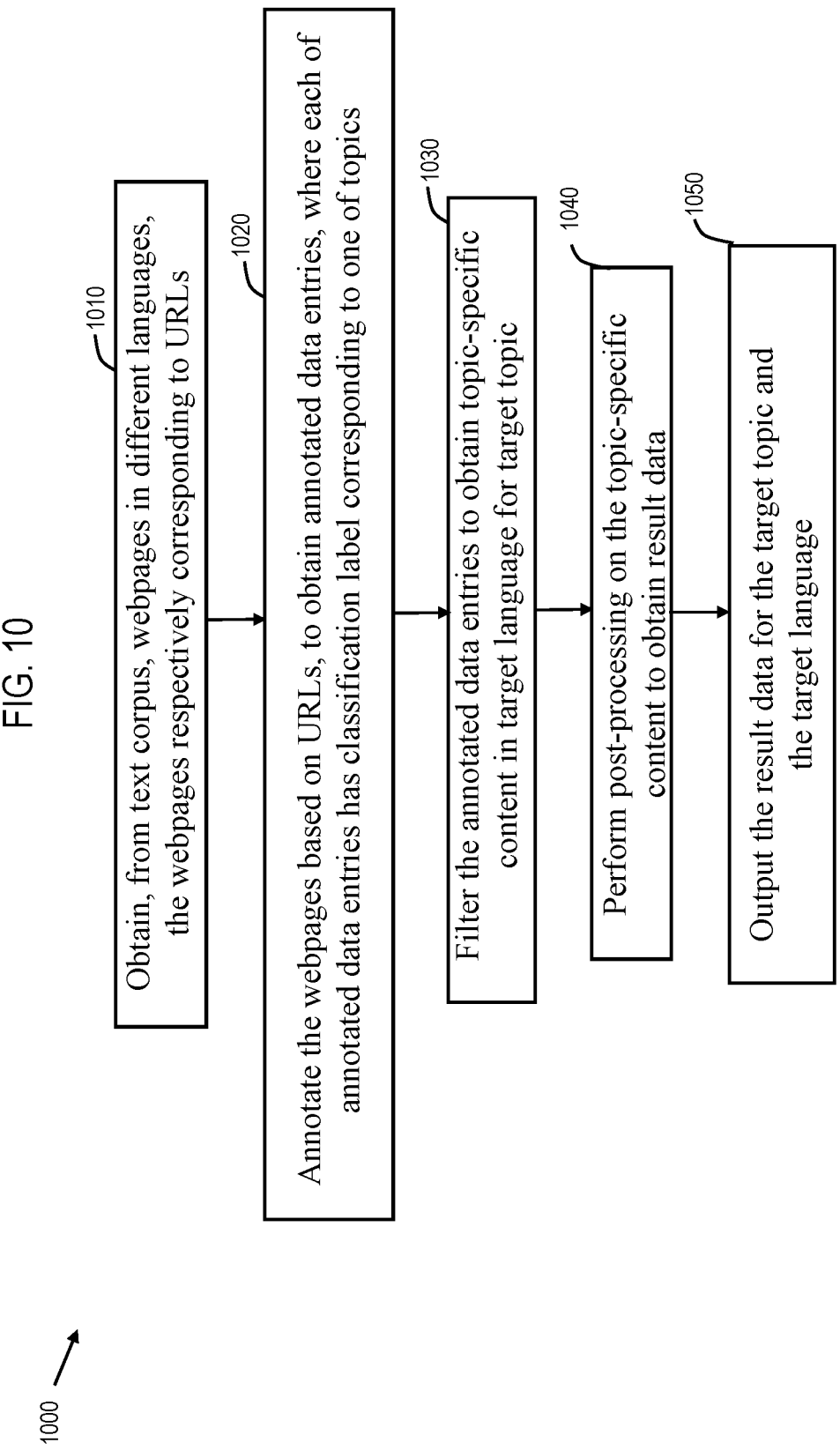
FIG. 10 is a flowchart of a method in accordance with various embodiments.

FIG. 10 depicts a simplified flowchart of a processing 1000 performed by the dataset generation system 400 according to various embodiments.

The processing 1000 depicted in FIG. 10 may be implemented in software (e.g., code, instructions, program) executed by one or more processing units (e.g., processors, cores) of the respective systems, using hardware, or combinations thereof. The software may be stored on a non-transitory storage medium (e.g., on a memory device). The method presented in FIG. 10 and described below is intended to be illustrative and non-limiting. Although FIG. 10 depicts the various processing operations occurring in a particular sequence or order, this is not intended to be limiting. In certain alternative embodiments, the processing 1000 may be performed in some different order or some operations may be performed in parallel.

Referring to FIG. 10, at 1010, the dataset generation system 400 obtains, from text corpus, a plurality of webpages in a plurality of different languages, where each of the plurality of webpages corresponds to an URL.

In an embodiment, the obtaining the plurality of webpages may include detecting a language of the plurality of webpages, respectively; computing a language confidence score for the language detected for each the plurality of webpages; and discarding, from the plurality of webpages, webpages whose language confidence score is less than a predetermined threshold.

In an embodiment, the obtaining the plurality of webpages may include tokenizing raw content included in each of the plurality of webpages into sentences.

At 1020, the dataset generation system 400 annotates the plurality of webpages based on the URLs, to obtain annotated data entries corresponding to the plurality of webpages, where each of the annotated data entries includes a classification label corresponding to one of a plurality of topics.

In an embodiment, each of the annotated data entries includes a raw content section and a sentences section where raw content of the raw content section is tokenized into sentences.

In an embodiment, the annotating may further include inserting tags in each of the annotated data entries, where the tags identify, for a corresponding webpage, the respective URL, the classification label for the URL, the target language, a target language confidence score, a webpage title, the raw content section, and/or the sentences section.

In an embodiment, a first user selection input providing an identification of the target language may be received prior to the annotating. The first user selection input may be provided by a customer of a cloud service provider.

At 1030, the dataset generation system 400 performs a first filtering for the annotated data entries to obtain topic-specific content in a target language among the plurality of languages, by comparing sub-topics associated with a target topic, among the plurality of topics, and the classification label in the annotated data entries, respectively, and obtaining, from the annotated data entries, topic-specific content corresponding to the sub-topics based on the comparing. The topic-specific content may include tokenized sentences. For example, the target topic may include one or more related topics, e.g., a health topic and a medical topic.

In an embodiment, a second user selection input providing an identification of the target topic may be received prior to the first filtering. The second user selection input may be provided by a customer of a cloud service provider.

In an embodiment, the first filtering may further include comparing keywords of a predetermined lexicon for the topic and words in sentences included in one from among the topic-specific content and the annotated data entries; and obtaining the sentences containing the keywords, to generate lexicon-specific content.

At 1040, the dataset generation system 400 performs post-processing on the topic-specific content to obtain result data, by performing at least one from among a second filtering and a normalizing on sentences included in the text of the topic-specific content.

In an embodiment, the first filtering for the annotated data entries to obtain the topic-specific content may further include obtaining, from the topic-specific content, variation-specific content corresponding to a variation of the target language, by searching URLs of webpages corresponding to the topic-specific content for an indication of a geographic locality corresponding to the variation, where the post-processing is performed for the variation-specific content corresponding to the variation of the target language.

In an embodiment, the topic-specific content may be verified prior to the post-processing, by extracting, from the topic-specific content, webpages corresponding to at least one from among a verified source domain, a verified publication, and a verified public source, to obtain the topic-specific content that is verified.

In an embodiment, the post-processing may include the second filtering the sentences included in the topic-specific content to remove, from the topic-specific content, at least one from among an incomplete sentence and a grammatically incorrect sentence, to obtain a set of high-quality sentences; and normalizing the set of high-quality sentences by removing, from at least one sentence of the set of high-quality sentences, at least one from among a bullet point and an emoji.

In an embodiment, the post-processing may further include the second filtering on the sentences of the topic-specific content to identify sentences for a task-specific requirement.

At 1050, the dataset generation system 400 outputs the result data according to the target topic and the target language.

In an embodiment, the result data may be output as a model training dataset to be used as an input for training a speech recognition model.

In an embodiment, the first filtering and the post-processing may be performed for the plurality of topics, and the outputting the result data may include providing sets of result data that are obtained for each of the plurality of topics as a plurality of training datasets for building speech recognition models for the plurality of topics in the target language.

In an embodiment, the first filtering and the post-processing may be performed for the plurality of topics in the plurality of languages different from each other, and the outputting the result data may include providing sets of result data that are obtained for each of the plurality of topics in the plurality of languages as a plurality of training datasets for building speech recognition models in the plurality of languages for the plurality of topics.

Illustrative Systems

FIG. 11 depicts a simplified diagram of a distributed system 1100. In the illustrated example, distributed system 1100 includes one or more client computing devices 1102, 1104, 1106, and 1108, coupled to a server 1112 via one or more communication networks 1110. Clients computing devices 1102, 1104, 1106, and 1108 may be configured to execute one or more applications.

In various examples, server 1112 may be adapted to run one or more services or software applications that enable one or more embodiments described in this disclosure. In certain examples, server 1112 may also provide other services or software applications that may include non-virtual and virtual environments. In some examples, these services may be offered as web-based or cloud services, such as under a Software as a Service (SaaS) model to the users of client computing devices 1102, 1104, 1106, and/or 1108. Users operating client computing devices 1102, 1104, 1106, and/or 1108 may in turn utilize one or more client applications to interact with server 1112 to utilize the services provided by these components.

In the configuration depicted in FIG. 11, server 1112 may include one or more components 1118, 1120 and 1122 that implement the functions performed by server 1112. These components may include software components that may be executed by one or more processors, hardware components, or combinations thereof. It should be appreciated that various different system configurations are possible, which may be different from distributed system 1100. The example shown in FIG. 11 is thus one example of a distributed system for implementing an example system and is not intended to be limiting.

Users may use client computing devices 1102, 1104, 1106, and/or 1108 to execute one or more applications, models or chatbots, which may generate one or more events or models that may then be implemented or serviced in accordance with the teachings of this disclosure. A client device may provide an interface that enables a user of the client device to interact with the client device. The client device may also output information to the user via this interface. Although FIG. 11 depicts only four client computing devices, any number of client computing devices may be supported.

The client devices may include various types of computing systems such as portable handheld devices, general purpose computers such as personal computers and laptops, workstation computers, wearable devices, gaming systems, thin clients, various messaging devices, sensors or other sensing devices, and the like. These computing devices may run various types and versions of software applications and operating systems (e.g., Microsoft Windows®, Apple Macintosh®, UNIX® or UNIX-like operating systems, Linux or Linux-like operating systems such as Google Chrome™ OS) including various mobile operating systems (e.g., Microsoft Windows Mobile®, iOS®, Windows Phone®, Android™, BlackBerry®, Palm OS®). Portable handheld devices may include cellular phones, smartphones, (e.g., an iPhone®), tablets (e.g., iPad®), personal digital assistants (PDAs), and the like. Wearable devices may include Google Glass® head mounted display, and other devices. Gaming systems may include various handheld gaming devices, Internet-enabled gaming devices (e.g., a Microsoft Xbox® gaming console with or without a Kinect® gesture input device, Sony PlayStation® system, various gaming systems provided by Nintendo®, and others), and the like. The client devices may be capable of executing various different applications such as various Internet-related apps, communication applications (e.g., E-mail applications, short message service (SMS) applications) and may use various communication protocols.

Network(s) 1110 may be any type of network familiar to those skilled in the art that may support data communications using any of a variety of available protocols, including without limitation TCP/IP (transmission control protocol/Internet protocol), SNA (systems network architecture), IPX (Internet packet exchange), AppleTalk®, and the like. Merely by way of example, network(s) 1110 may be a local area network (LAN), networks based on Ethernet, Token-Ring, a wide-area network (WAN), the Internet, a virtual network, a virtual private network (VPN), an intranet, an extranet, a public switched telephone network (PSTN), an infra-red network, a wireless network (e.g., a network operating under any of the Institute of Electrical and Electronics (IEEE) 1002.11 suite of protocols, Bluetooth®, and/or any other wireless protocol), and/or any combination of these and/or other networks.

Server 1112 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. Server 1112 may include one or more virtual machines running virtual operating systems, or other computing architectures involving virtualization such as one or more flexible pools of logical storage devices that may be virtualized to maintain virtual storage devices for the server. In various examples, server 1112 may be adapted to run one or more services or software applications that provide the functionality described in the foregoing disclosure.

The computing systems in server 1112 may run one or more operating systems including any of those discussed above, as well as any commercially available server operating system. Server 1112 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle®, Microsoft®, Sybase®, IBM® (International Business Machines), and the like.

In some implementations, server 1112 may include one or more applications to analyze and consolidate data feeds and/or event updates received from users of client computing devices 1102, 1104, 1106, and 1108. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 1112 may also include one or more applications to display the data feeds and/or real-time events via one or more display devices of client computing devices 1102, 1104, 1106, and 1108.

Distributed system 1100 may also include one or more data repositories 1114, 1116. These data repositories may be used to store data and other information in certain examples. For example, one or more of the data repositories 1114, 1116 may be used to store information such as information related to chatbot performance or generated models for use by chatbots used by server 1112 when performing various functions in accordance with various embodiments. Data repositories 1114, 1116 may reside in a variety of locations. For example, a data repository used by server 1112 may be local to server 1112 or may be remote from server 1112 and in communication with server 1112 via a network-based or dedicated connection. Data repositories 1114, 1116 may be of different types. In certain examples, a data repository used by server 1112 may be a database, for example, a relational database, such as databases provided by Oracle Corporation® and other vendors. One or more of these databases may be adapted to enable storage, update, and retrieval of data to and from the database in response to SQL-formatted commands.

In certain examples, one or more of data repositories 1114, 1116 may also be used by applications to store application data. The data repositories used by applications may be of different types such as, for example, a key-value store repository, an object store repository, or a general storage repository supported by a file system.

Figure 12:
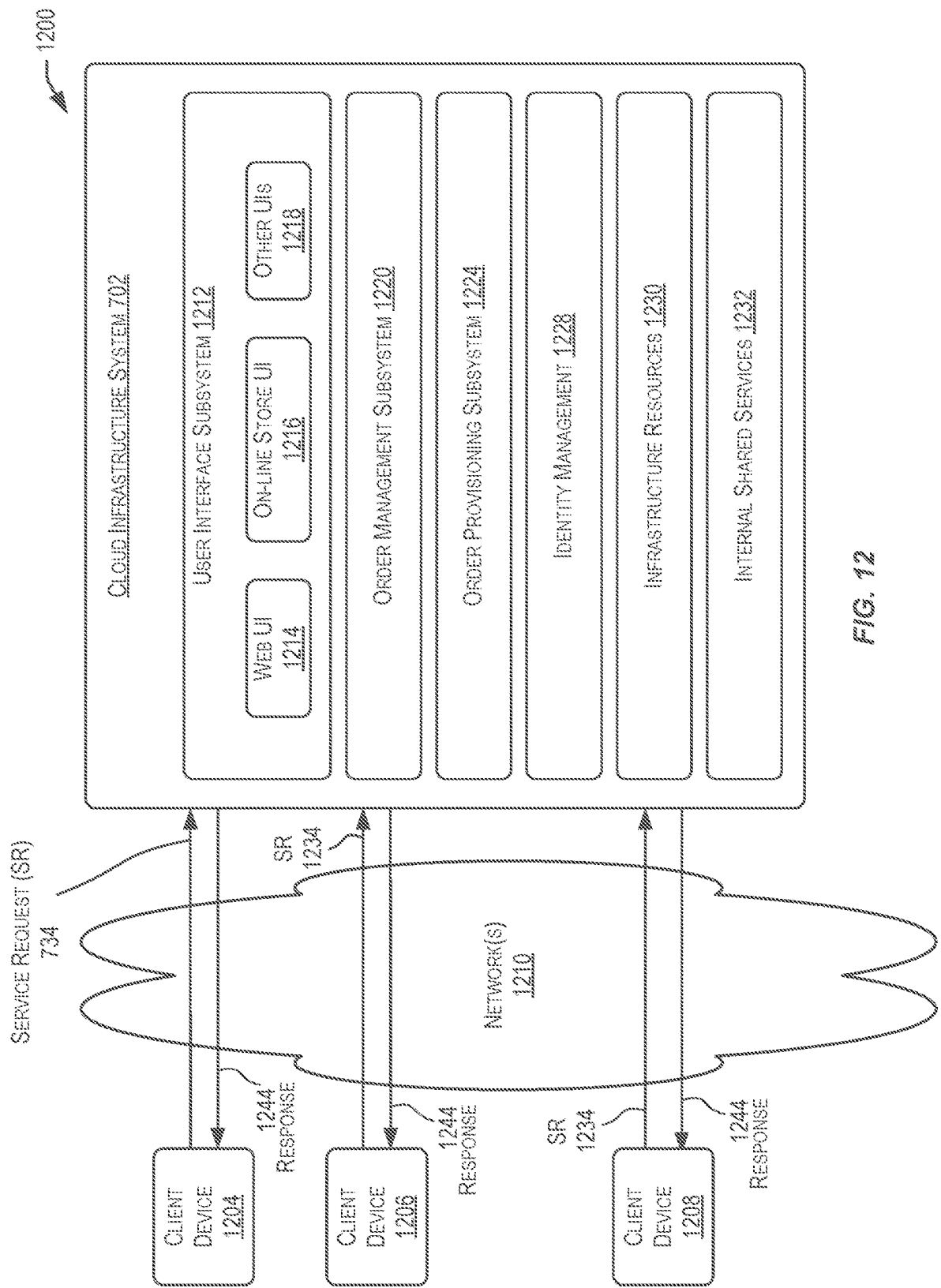
FIG. 12 is a simplified block diagram of one or more components of a system environment by which services provided by one or more components of an embodiment system may be offered as cloud services, in accordance with various embodiments.

In certain examples, the functionalities described in this disclosure may be offered as services via a cloud environment. FIG. 12 is a simplified block diagram of a cloud-based system environment in which various services may be offered as cloud services in accordance with certain examples. In the example depicted in FIG. 12, cloud infrastructure system 1202 may provide one or more cloud services that may be requested by users using one or more client computing devices 1204, 1206, and 1208. Cloud infrastructure system 1202 may include one or more computers and/or servers that may include those described above for server 1112. The computers in cloud infrastructure system 1202 may be organized as general purpose computers, specialized server computers, server farms, server clusters, or any other appropriate arrangement and/or combination.

Network(s) 1210 may facilitate communication and exchange of data between clients 1204, 1206, and 1208 and cloud infrastructure system 1202. Network(s) 1210 may include one or more networks. The networks may be of the same or different types. Network(s) 1210 may support one or more communication protocols, including wired and/or wireless protocols, for facilitating the communications.

The example depicted in FIG. 12 is only one example of a cloud infrastructure system and is not intended to be limiting. It should be appreciated that, in some other examples, cloud infrastructure system 1202 may have more or fewer components than those depicted in FIG. 12, may combine two or more components, or may have a different configuration or arrangement of components. For example, although FIG. 12 depicts three client computing devices, any number of client computing devices may be supported in alternative examples.

The term cloud service is generally used to refer to a service that is made available to users on demand and via a communication network such as the Internet by systems (e.g., cloud infrastructure system 1202) of a service provider. Typically, in a public cloud environment, servers and systems that make up the cloud service provider's system are different from the customer's own on-premises servers and systems. The cloud service provider's systems are managed by the cloud service provider. Customers may thus avail themselves of cloud services provided by a cloud service provider without having to purchase separate licenses, support, or hardware and software resources for the services. For example, a cloud service provider's system may host an application, and a user may, via the Internet, on demand, order and use the application without the user having to buy infrastructure resources for executing the application. Cloud services are designed to provide easy, scalable access to applications, resources and services. Several providers offer cloud services. For example, several cloud services are offered by Oracle Corporation® of Redwood Shores, California, such as middleware services, database services, Java cloud services, and others.

In certain examples, cloud infrastructure system 1202 may provide one or more cloud services using different models such as under a Software as a Service (SaaS) model, a Platform as a Service (PaaS) model, an Infrastructure as a Service (IaaS) model, and others, including hybrid service models. Cloud infrastructure system 1202 may include a suite of applications, middleware, databases, and other resources that enable provision of the various cloud services.

A SaaS model enables an application or software to be delivered to a customer over a communication network like the Internet, as a service, without the customer having to buy the hardware or software for the underlying application. For example, a SaaS model may be used to provide customers access to on-demand applications that are hosted by cloud infrastructure system 1202. Examples of SaaS services provided by Oracle Corporation® include, without limitation, various services for human resources/capital management, customer relationship management (CRM), enterprise resource planning (ERP), supply chain management (SCM), enterprise performance management (EPM), analytics services, social applications, and others.

An IaaS model is generally used to provide infrastructure resources (e.g., servers, storage, hardware and networking resources) to a customer as a cloud service to provide elastic compute and storage capabilities. Various IaaS services are provided by Oracle Corporation®.

A PaaS model is generally used to provide, as a service, platform and environment resources that enable customers to develop, run, and manage applications and services without the customer having to procure, build, or maintain such resources. Examples of PaaS services provided by Oracle Corporation® include, without limitation, Oracle Java Cloud Service (JCS), Oracle Database Cloud Service (DBCS), data management cloud service, various application development solutions services, and others.

Cloud services are generally provided on an on-demand self-service basis, subscription-based, elastically scalable, reliable, highly available, and secure manner. For example, a customer, via a subscription order, may order one or more services provided by cloud infrastructure system 1202. Cloud infrastructure system 1202 then performs processing to provide the services requested in the customer's subscription order. For example, a user may use utterances to request the cloud infrastructure system to take a certain action (e.g., an intent), as described above, and/or provide services for a chatbot system as described herein. Cloud infrastructure system 1202 may be configured to provide one or even multiple cloud services.

Cloud infrastructure system 1202 may provide the cloud services via different deployment models. In a public cloud model, cloud infrastructure system 1202 may be owned by a third party cloud services provider and the cloud services are offered to any general public customer, where the customer may be an individual or an enterprise. In certain other examples, under a private cloud model, cloud infrastructure system 1202 may be operated within an organization (e.g., within an enterprise organization) and services provided to customers that are within the organization. For example, the customers may be various departments of an enterprise such as the Human Resources department, the Payroll department, etc. or even individuals within the enterprise. In certain other examples, under a community cloud model, the cloud infrastructure system 1202 and the services provided may be shared by several organizations in a related community. Various other models such as hybrids of the above mentioned models may also be used.

Client computing devices 1204, 1206, and 1208 may be of different types (such as client computing devices 1102, 1104, 1106, and 1108 depicted in FIG. 11) and may be capable of operating one or more client applications. A user may use a client device to interact with cloud infrastructure system 1202, such as to request a service provided by cloud infrastructure system 1202. For example, a user may use a client device to request information or action from a chatbot as described in this disclosure.

In some examples, the processing performed by cloud infrastructure system 1202 for providing services may involve model training and deployment. This analysis may involve using, analyzing, and manipulating data sets to train and deploy one or more models. This analysis may be performed by one or more processors, possibly processing the data in parallel, performing simulations using the data, and the like. For example, big data analysis may be performed by cloud infrastructure system 1202 for generating and training one or more models for a chatbot system. The data used for this analysis may include structured data (e.g., data stored in a database or structured according to a structured model) and/or unstructured data (e.g., data blobs (binary large objects)).

As depicted in the example in FIG. 12, cloud infrastructure system 1202 may include infrastructure resources 1230 that are utilized for facilitating the provision of various cloud services offered by cloud infrastructure system 1202. Infrastructure resources 1230 may include, for example, processing resources, storage or memory resources, networking resources, and the like. In certain examples, the storage virtual machines that are available for servicing storage requested from applications may be part of cloud infrastructure system 1202. In other examples, the storage virtual machines may be part of different systems.

In certain examples, to facilitate efficient provisioning of these resources for supporting the various cloud services provided by cloud infrastructure system 1202 for different customers, the resources may be bundled into sets of resources or resource modules (also referred to as "pods"). Each resource module or pod may include a pre-integrated and optimized combination of resources of one or more types. In certain examples, different pods may be preprovisioned for different types of cloud services. For example, a first set of pods may be provisioned for a database service, a second set of pods, which may include a different combination of resources than a pod in the first set of pods, may be provisioned for Java service, and the like. For some services, the resources allocated for provisioning the services may be shared between the services.

Cloud infrastructure system 1202 may itself internally use services 1232 that are shared by different components of cloud infrastructure system 1202 and which facilitate the provisioning of services by cloud infrastructure system 1202. These internal shared services may include, without limitation, a security and identity service, an integration service, an enterprise repository service, an enterprise manager service, a virus scanning and whitelist service, a high availability, backup and recovery service, service for enabling cloud support, an email service, a notification service, a file transfer service, and the like.

Cloud infrastructure system 1202 may include multiple subsystems. These subsystems may be implemented in software, or hardware, or combinations thereof. As depicted in FIG. 12, the subsystems may include a user interface subsystem 1212 that enables users or customers of cloud infrastructure system 1202 to interact with cloud infrastructure system 1202. User interface subsystem 1212 may include various different interfaces such as a web interface 1214, an online store interface 1216 where cloud services provided by cloud infrastructure system 1202 are advertised and are purchasable by a consumer, and other interfaces 1218. For example, a customer may, using a client device, request (service request 1234) one or more services provided by cloud infrastructure system 1202 using one or more of interfaces 1214, 1216, and 1218. For example, a customer may access the online store, browse cloud services offered by cloud infrastructure system 1202, and place a subscription order for one or more services offered by cloud infrastructure system 1202 that the customer wishes to subscribe to. The service request may include information identifying the customer and one or more services that the customer desires to subscribe to. For example, a customer may place a subscription order for a service offered by cloud infrastructure system 1202. As part of the order, the customer may provide information identifying a chatbot system for which the service is to be provided and optionally one or more credentials for the chatbot system.

In certain examples, such as the example depicted in FIG. 12, cloud infrastructure system 1202 may include an order management subsystem (OMS) 1220 that is configured to process the new order. As part of this processing, OMS 1220 may be configured to: create an account for the customer, if not done already; receive billing and/or accounting information from the customer that is to be used for billing the customer for providing the requested service to the customer; verify the customer information; upon verification, book the order for the customer; and orchestrate various workflows to prepare the order for provisioning.

Once properly validated, OMS 1220 may then invoke the order provisioning subsystem (OPS) 1224 that is configured to provision resources for the order including processing, memory, and networking resources. The provisioning may include allocating resources for the order and configuring the resources to facilitate the service requested by the customer order. The manner in which resources are provisioned for an order and the type of the provisioned resources may depend upon the type of cloud service that has been ordered by the customer. For example, according to one workflow, OPS 1224 may be configured to determine the particular cloud service being requested and identify a number of pods that may have been pre-configured for that particular cloud service. The number of pods that are allocated for an order may depend upon the size/amount/level/scope of the requested service. For example, the number of pods to be allocated may be determined based upon the number of users to be supported by the service, the duration of time for which the service is being requested, and the like. The allocated pods may then be customized for the particular requesting customer for providing the requested service.

In certain examples, setup phase processing, as described above, may be performed by cloud infrastructure system 1202 as part of the provisioning process. Cloud infrastructure system 1202 may generate an application ID and select a storage virtual machine for an application from among storage virtual machines provided by cloud infrastructure system 1202 itself or from storage virtual machines provided by other systems other than cloud infrastructure system 1202.

Cloud infrastructure system 1202 may send a response or notification 1244 to the requesting customer to indicate when the requested service is now ready for use. In some instances, information (e.g., a link) may be sent to the customer that enables the customer to start using and availing the benefits of the requested services. In certain examples, for a customer requesting the service, the response may include a chatbot system ID generated by cloud infrastructure system 1202 and information identifying a chatbot system selected by cloud infrastructure system 1202 for the chatbot system corresponding to the chatbot system ID.

Cloud infrastructure system 1202 may provide services to multiple customers. For each customer, cloud infrastructure system 1202 is responsible for managing information related to one or more subscription orders received from the customer, maintaining customer data related to the orders, and providing the requested services to the customer. Cloud infrastructure system 1202 may also collect usage statistics regarding a customer's use of subscribed services. For example, statistics may be collected for the amount of storage used, the amount of data transferred, the number of users, and the amount of system up time and system down time, and the like. This usage information may be used to bill the customer. Billing may be done, for example, on a monthly cycle.

Cloud infrastructure system 1202 may provide services to multiple customers in parallel. Cloud infrastructure system 1202 may store information for these customers, including possibly proprietary information. In certain examples, cloud infrastructure system 1202 includes an identity management subsystem (IMS) 1228 that is configured to manage customer information and provide the separation of the managed information such that information related to one customer is not accessible by another customer. IMS 1228 may be configured to provide various security-related services such as identity services, such as information access management, authentication and authorization services, services for managing customer identities and roles and related capabilities, and the like.

Figure 13:
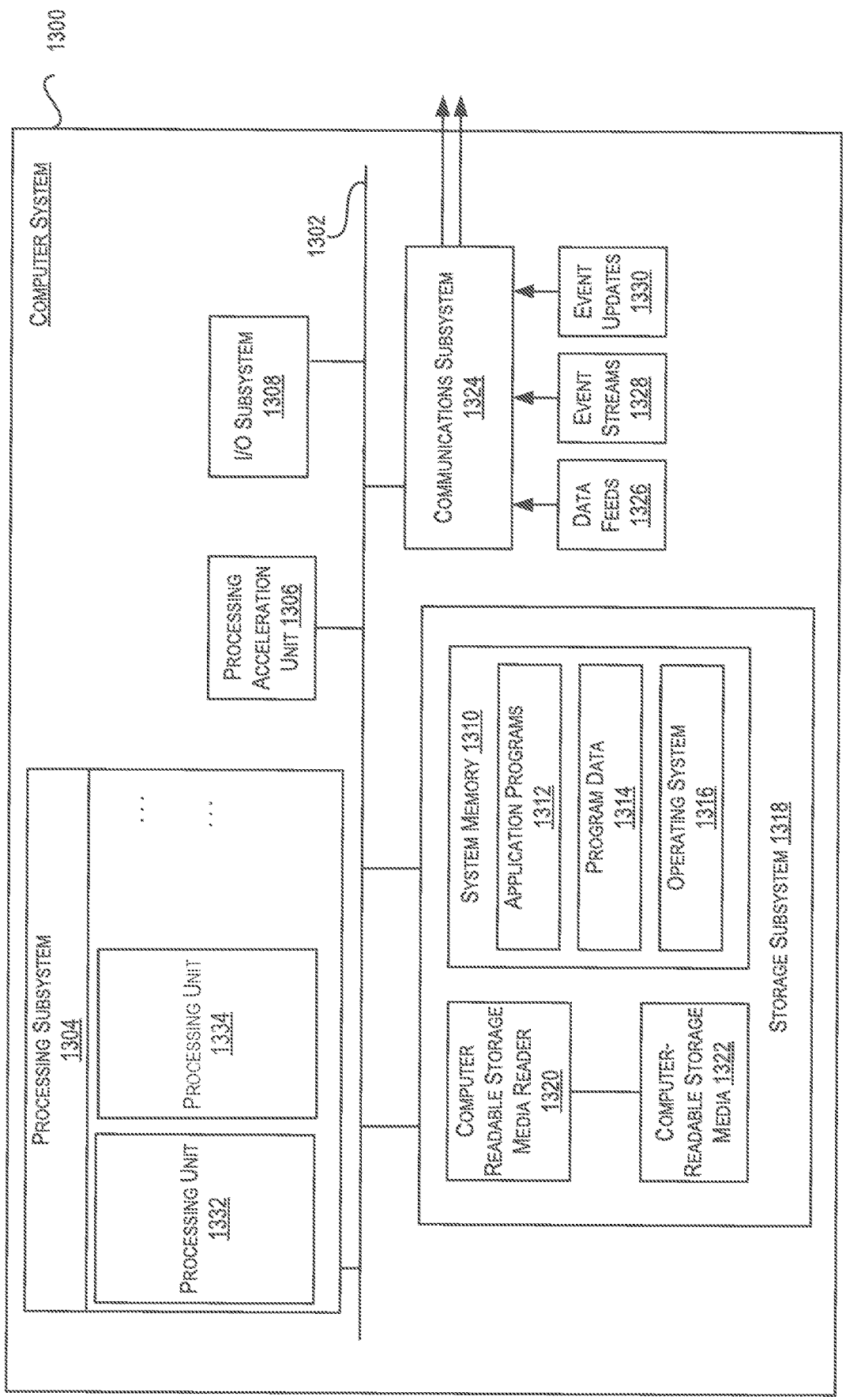
FIG. 13 illustrates an example computer system that may be used to implement various embodiments.

FIG. 13 illustrates an example of computer system 1300. In some examples, computer system 1300 may be used to implement any of the digital assistant or chatbot systems within a distributed environment, and various servers and computer systems described above. As shown in FIG. 13, computer system 1300 includes various subsystems including a processing subsystem 1304 that communicates with a number of other subsystems via a bus subsystem 1302.

These other subsystems may include a processing acceleration unit 1306, an I/O subsystem 1308, a storage subsystem 1318, and a communications subsystem 1324. Storage subsystem 1318 may include non-transitory computer-readable storage media including computer-readable storage media 1322 and a system memory 1310.

Bus subsystem 1302 provides a mechanism for letting the various components and subsystems of computer system 1300 communicate with each other as intended. Although bus subsystem 1302 is shown schematically as a single bus, alternative examples of the bus subsystem may utilize multiple buses. Bus subsystem 1302 may be any of several types of bus structures including a memory bus or memory controller, a peripheral bus, a local bus using any of a variety of bus architectures, and the like. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which may be implemented as a Mezzanine bus manufactured to the IEEE P1386.1 standard, and the like.

Processing subsystem 1304 controls the operation of computer system 1300 and may include one or more processors, application specific integrated circuits (ASICs), or field programmable gate arrays (FPGAs). The processors may include be single core or multicore processors. The processing resources of computer system 1300 may be organized into one or more processing units 1332, 1334, etc. A processing unit may include one or more processors, one or more cores from the same or different processors, a combination of cores and processors, or other combinations of cores and processors. In some examples, processing subsystem 1304 may include one or more special purpose co-processors such as graphics processors, digital signal processors (DSPs), or the like. In some examples, some or all of the processing units of processing subsystem 1304 may be implemented using customized circuits, such as application specific integrated circuits (ASICs), or field programmable gate arrays (FPGAs).

In some examples, the processing units in processing subsystem 1304 may execute instructions stored in system memory 1310 or on computer-readable storage media 1322. In various examples, the processing units may execute a variety of programs or code instructions and may maintain multiple concurrently executing programs or processes. At any given time, some or all of the program code to be executed may be resident in system memory 1310 and/or on computer-readable storage media 1322 including potentially on one or more storage devices. Through suitable programming, processing subsystem 1304 may provide various functionalities described above. In instances where computer system 1300 is executing one or more virtual machines, one or more processing units may be allocated to each virtual machine.

In certain examples, a processing acceleration unit 1306 may optionally be provided for performing customized processing or for off-loading some of the processing performed by processing subsystem 1304 so as to accelerate the overall processing performed by computer system 1300.

I/O subsystem 1308 may include devices and mechanisms for inputting information to computer system 1300 and/or for outputting information from or via computer system 1300. In general, use of the term input device is intended to include all possible types of devices and mechanisms for inputting information to computer system 1300. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Microsoft Kinect® motion sensor that enables users to control and interact with an input device, the Microsoft Xbox® 360 game controller, devices that provide an interface for receiving input using gestures and spoken commands. User interface input devices may also include eye gesture recognition devices such as the Google Glass® blink detector that detects eye activity (e.g., "blinking" while taking pictures and/or making a menu selection) from users and transforms the eye gestures as inputs to an input device (e.g., Google Glass®). Additionally, user interface input devices may include voice recognition sensing devices that enable users to interact with voice recognition systems (e.g., Siri® navigator) through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, and medical ultrasonography devices. User interface input devices may also include, for example, audio input devices such as MIDI keyboards, digital musical instruments and the like.

In general, use of the term output device is intended to include all possible types of devices and mechanisms for outputting information from computer system 1300 to a user or other computer. User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. For example, user interface output devices may include, without limitation, a variety of display devices that visually convey text, graphics and audio/video information such as monitors, printers, speakers, headphones, automotive navigation systems, plotters, voice output devices, and modems.

Storage subsystem 1318 provides a repository or data store for storing information and data that is used by computer system 1300. Storage subsystem 1318 provides a tangible non-transitory computer-readable storage medium for storing the basic programming and data constructs that provide the functionality of some examples. Storage subsystem 1318 may store software (e.g., programs, code modules, instructions) that when executed by processing subsystem 1304 provides the functionality described above. The software may be executed by one or more processing units of processing subsystem 1304. Storage subsystem 1318 may also provide authentication in accordance with the teachings of this disclosure.

Storage subsystem 1318 may include one or more non-transitory memory devices, including volatile and non-volatile memory devices. As shown in FIG. 13, storage subsystem 1318 includes a system memory 1310 and a computer-readable storage media 1322. System memory

1310 may include a number of memories including a volatile main random access memory (RAM) for storage of instructions and data during program execution and a non-volatile read only memory (ROM) or flash memory in which fixed instructions are stored. In some implementations, a basic input/output system (BIOS), containing the basic routines that help to transfer information between elements within computer system 1300, such as during start-up, may typically be stored in the ROM. The RAM typically contains data and/or program modules that are presently being operated and executed by processing subsystem 1304. In some implementations, system memory 1310 may include multiple different types of memory, such as static random access memory (SRAM), dynamic random access memory (DRAM), and the like.

By way of example, and not limitation, as depicted in FIG. 13, system memory 1310 may load application programs 1312 that are being executed, which may include various applications such as Web browsers, mid-tier applications, relational database management systems (RDBMS), etc., program data 1314, and an operating system 1316. By way of example, operating system 1316 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® OS, Palm® OS operating systems, and others.

Computer-readable storage media 1322 may store programming and data constructs that provide the functionality of some examples. Computer-readable media 1322 may provide storage of computer-readable instructions, data structures, program modules, and other data for computer system 1300. Software (programs, code modules, instructions) that, when executed by processing subsystem 1304 provides the functionality described above, may be stored in storage subsystem 1318. By way of example, computer-readable storage media 1322 may include non-volatile memory such as a hard disk drive, a magnetic disk drive, an optical disk drive such as a CD ROM, DVD, a Blu-Ray® disk, or other optical media. Computer-readable storage media 1322 may include, but is not limited to, Zip® drives, flash memory cards, universal serial bus (USB) flash drives, secure digital (SD) cards, DVD disks, digital video tape, and the like. Computer-readable storage media 1322 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs.

In certain examples, storage subsystem 1318 may also include a computer-readable storage media reader 1320 that may further be connected to computer-readable storage media 1322. The computer-readable storage media reader 1320 may receive and be configured to read data from a memory device such as a disk, a flash drive, etc.

In certain examples, computer system 1300 may support virtualization technologies, including but not limited to virtualization of processing and memory resources. For example, computer system 1300 may provide support for executing one or more virtual machines. In certain examples, computer system 1300 may execute a program such as a hypervisor that facilitated the configuring and managing of the virtual machines. Each virtual machine may be allocated memory, compute (e.g., processors, cores), I/O, and networking resources. Each virtual machine generally runs independently of the other virtual machines. A virtual machine typically runs its own operating system, which may be the same as or different from the operating systems executed by other virtual machines executed by computer system 1300. Accordingly, multiple operating systems may potentially be run concurrently by computer system 1300.

Communications subsystem 1324 provides an interface to other computer systems and networks. Communications subsystem 1324 serves as an interface for receiving data from and transmitting data to other systems from computer system 1300. For example, communications subsystem 1324 may enable computer system 1300 to establish a communication channel to one or more client devices via the Internet for receiving and sending information from and to the client devices. For example, when computer system 1300 is used to implement bot system 130 depicted in FIG. 1, the communication subsystem may be used to communicate with a chatbot system selected for an application.

Communication subsystem 1324 may support both wired and/or wireless communication protocols. In certain examples, communications subsystem 1324 may include radio frequency (RF) transceiver components for accessing wireless voice and/or data networks (e.g., using cellular telephone technology), advanced data network technology, such as 3G, 4G or EDGE (enhanced data rates for global evolution), WiFi (IEEE 1002.XX family standards, or other mobile communication technologies, or any combination thereof), global positioning system (GPS) receiver components, and/or other components. In some examples, communications subsystem 1324 may provide wired network connectivity (e.g., Ethernet) in addition to or instead of a wireless interface.

Communication subsystem 1324 may receive and transmit data in various forms. In some examples, in addition to other forms, communications subsystem 1324 may receive input communications in the form of structured and/or unstructured data feeds 1326, event streams 1328, event updates 1330, and the like. For example, communications subsystem 1324 may be configured to receive (or send) data feeds 1326 in real-time from users of social media networks and/or other communication services such as Twitter® feeds, Facebook® updates, web feeds such as Rich Site Summary (RSS) feeds, and/or real-time updates from one or more third party information sources.

In certain examples, communications subsystem 1324 may be configured to receive data in the form of continuous data streams, which may include event streams 1328 of real-time events and/or event updates 1330, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1324 may also be configured to communicate data from computer system 1300 to other computer systems or networks. The data may be communicated in various different forms such as structured and/or unstructured data feeds 1326, event streams 1328, event updates 1330, and the like to one or more databases that may be in communication with one or more streaming data source computers coupled to computer system 1300.

Computer system 1300 may be one of various types, including a handheld portable device (e.g., an iPhone® cellular phone, an iPad® computing tablet, a PDA), a wearable device (e.g., a Google Glass® head mounted display), a personal computer, a workstation, a mainframe, a kiosk, a server rack, or any other data processing system. Due to the ever-changing nature of computers and networks, the description of computer system 1300 depicted in FIG. 13 is intended only as a specific example. Many other configurations having more or fewer components than the system depicted in FIG. 12 are possible. Based on the disclosure and teachings provided herein, it should be appreciated that there are other ways and/or methods to implement the various examples.

Although specific examples have been described, various modifications, alterations, alternative constructions, and equivalents are possible. Examples are not restricted to operation within certain specific data processing environments, but are free to operate within a plurality of data processing environments. Additionally, although certain examples have been described using a particular series of transactions and steps, it should be apparent to those skilled in the art that this is not intended to be limiting. Although some flowcharts describe operations as a sequential process, many of the operations may be performed in parallel or concurrently. In addition, the order of the operations may be rearranged. A process may have additional steps not included in the figure. Various features and aspects of the above-described examples may be used individually or jointly.

Further, while certain examples have been described using a particular combination of hardware and software, it should be recognized that other combinations of hardware and software are also possible. Certain examples may be implemented only in hardware, or only in software, or using combinations thereof. The various processes described herein may be implemented on the same processor or different processors in any combination.

Where devices, systems, components or modules are described as being configured to perform certain operations or functions, such configuration may be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes may communicate using a variety of techniques including but not limited to related art techniques for inter-process communications, and different pairs of processes may use different techniques, or the same pair of processes may use different techniques at different times.

Specific details are given in this disclosure to provide a thorough understanding of the examples. However, examples may be practiced without these specific details. For example, well-known circuits, processes, algorithms, structures, and techniques have been shown without unnecessary detail in order to avoid obscuring the examples. This description provides example examples only, and is not intended to limit the scope, applicability, or configuration of other examples. Rather, the preceding description of the examples will provide those skilled in the art with an enabling description for implementing various examples. Various changes may be made in the function and arrangement of elements.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific examples have been described, these are not intended to be limiting. Various modifications and equivalents are within the scope of the following claims.

In the foregoing specification, aspects of the disclosure are described with reference to specific examples thereof, but those skilled in the art will recognize that the disclosure is not limited thereto. Various features and aspects of the above-described disclosure may be used individually or jointly. Further, examples may be utilized in any number of environments and applications beyond those described herein without departing from the broader spirit and scope of the specification. The specification and drawings are, accordingly, to be regarded as illustrative rather than restrictive.

In the foregoing description, for the purposes of illustration, methods were described in a particular order. It should be appreciated that in alternate examples, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMS, EPROMS, EEPROMs, magnetic or optical cards, flash memory, or other types of machine-readable mediums suitable for storing electronic instructions. Alternatively, the methods may be performed by a combination of hardware and software.

Where components are described as being configured to perform certain operations, such configuration may be accomplished, for example, by designing electronic circuits or other hardware to perform the operation, by programming programmable electronic circuits (e.g., microprocessors, or other suitable electronic circuits) to perform the operation, or any combination thereof.

While illustrative examples of the application have been described in detail herein, it is to be understood that the inventive concepts may be otherwise variously embodied and employed, and that the appended claims are intended to be construed to include such variations, except as limited by the prior art.

What is claimed is:

1. A computer-implemented method comprising:
    (a) obtaining, by a dataset generation system from a text corpus, a plurality of webpages in a plurality of languages, each of the plurality of webpages corresponding to a respective universal resource locator (URL);
    (b) annotating, by the dataset generation system, each of the plurality of webpages based on the respective URL, to obtain annotated data entries, each of the annotated data entries corresponding to one of the plurality of webpages and comprising a classification label corresponding to a sub-topic of one of a plurality of topics, wherein each of the plurality of topics comprises a corresponding plurality of sub-topics;

(c) performing, by the dataset generation system, a first filtering for the annotated data entries to obtain topic-specific content in a target language among the plurality of languages by:
    comparing one or more sub-topics among the corresponding plurality of sub-topics with classification labels correspondingly included in the annotated data entries, wherein the one or more sub-topics are associated with a topic among the plurality of topics, and
    obtaining, from the annotated data entries, the topic-specific content corresponding to the one or more sub-topics based on the comparing; and
(d) performing, by the dataset generation system, post-processing on the topic-specific content to obtain result data, by performing at least one from among a second filtering and a normalizing on sentences included in the topic-specific content,
wherein (c) and (d) are performed for a plurality of different target languages among the plurality of languages, the target language being a first target language of the plurality of different target languages;
outputting, by the dataset generation system, the result data for each of the plurality of different target languages as a plurality of model training datasets for the topic for which (c) and (d) were performed;
transmitting, by the dataset generation system to a model training system, at least a first model training dataset among the plurality of model training datasets, the first model training dataset corresponding to the first target language;
training, by the model training system, a first machine learning model using the first model training dataset in the first target language, the training comprising inputting, into the first machine learning model, training examples from the first model training dataset, to obtain a set of values for model parameters for a first speech recognition model; and
generating, by the model training system, the first speech recognition model in the first target language, for the topic for which (c) and (d) were performed, wherein the first speech recognition model is configured with the set of values for a set of predetermined sentiments or a set of predetermined intents,
wherein the first speech recognition model is configured to, based on one or more sentences provided as an input by a user in the first target language, identify a certain sentiment from the set of predetermined sentiments or a certain intent from the set of predetermined intents, and output, for the one or more sentences, a prediction of the certain sentiment or a prediction of the certain intent.

2. The computer-implemented method of claim 1, wherein the performing the first filtering further comprises:
    comparing keywords of a predetermined lexicon for the topic with words in sentences included in one from among the topic-specific content and the annotated data entries; and
    obtaining the sentences containing the keywords, to generate topic-specific, lexicon-specific content,
    wherein the performing the post-processing on the topic-specific content comprises performing the post-processing on the topic-specific, lexicon-specific content.

3. The computer-implemented method of claim 1, wherein the performing the first filtering further comprises:
    obtaining, from the topic-specific content, variation-specific content corresponding to a variation of the target language, by searching URLs of webpages corresponding to the topic-specific content for an indication of a geographic locality corresponding to the variation,
    wherein the performing the post-processing on the topic-specific content comprises performing the post-processing on the variation-specific content.

4. The computer-implemented method of claim 1, wherein the obtaining the plurality of webpages further comprises:
    detecting a language of the plurality of webpages, respectively;
    computing a language confidence score for the detected language; and
    discarding, from the plurality of webpages, webpages whose language confidence score is less than a predetermined threshold, prior to the annotating.

5. The computer-implemented method of claim 1, wherein:
    the obtaining the plurality of webpages further comprises tokenizing raw content included in each of the plurality of webpages into sentences, and
    the sentences included in the topic-specific content are tokenized sentences.

6. The computer-implemented method of claim 1, wherein the performing the post-processing further comprises:
    performing the second filtering on the sentences included in the topic-specific content to remove, from the topic-specific content, at least one from among an incomplete sentence and a grammatically incorrect sentence, to obtain a set of high-quality sentences; and
    normalizing the set of high-quality sentences by removing, from at least one sentence of the set of high-quality sentences, at least one from among a bullet point and an emoji.

7. The computer-implemented method of claim 1, further comprising:
    prior to the performing the post-processing, verifying the topic-specific content by extracting, from the topic-specific content, webpages corresponding to at least one from among a verified source domain, a verified publication, and a verified public source, to obtain the topic-specific content that is verified.

8. The computer-implemented method of claim 1, wherein:
    each of the annotated data entries comprises a raw content section comprising raw content and a sentences section comprising sentences obtained by tokenizing the raw content, and
    the annotating further comprises:
        inserting tags in each of the annotated data entries, wherein the tags identify, for a webpage among the plurality of webpages, at least two from among the respective URL, the classification label for the URL, the target language, a target language confidence score, a webpage title, the raw content section, and the sentences section.

9. The computer-implemented method of claim 1, wherein:
    (c) and (d) are performed for the plurality of topics in the plurality of different target languages, and
    the outputting the result data further comprises providing sets of result data that are obtained for each of the plurality of topics in the plurality of languages as a plurality of training datasets for building speech recognition models in the plurality of different target languages for the plurality of topics.

10. The computer-implemented method of claim 1, wherein the performing the post-processing further comprises:
performing the second filtering on the sentences of the topic-specific content to identify sentences for a task-specific requirement,
wherein the task-specific requirement is a sentiment analysis.

11. The computer-implemented method of claim 1, further comprising:
prior to the annotating, receiving a first user selection input providing an identification of the target language; and
prior to the performing the first filtering, receiving a second user selection input providing an identification of the topic for which (c) and (d) are to be performed.

12. The computer-implemented method of claim 11, wherein the first user selection input and the second user selection input are provided by a customer of a cloud service provider.

13. A system comprising:
a model training system; and
a dataset generation system comprising one or more processors, and one or more computer-readable media storing instructions which, when executed by the one or more processors, cause the system to perform operations including:
(a) obtaining, from a text corpus, a plurality of webpages in a plurality of languages, each of the plurality of webpages corresponding to a respective universal resource locator (URL),
(b) annotating each of the plurality of webpages based on the respective URL, to obtain annotated data entries, each of the annotated data entries corresponding to one of the plurality of webpages and comprising a classification label corresponding to a sub-topic of one of a plurality of topics, wherein each of the plurality of topics comprises a corresponding plurality of sub-topics,
(c) performing a first filtering for the annotated data entries to obtain topic-specific content in a target language among the plurality of languages by:
comparing one or more sub-topics among the corresponding plurality of sub-topics with classification labels correspondingly included in the annotated data entries, wherein the one or more sub-topics are associated with a topic among the plurality of topics, and obtaining, from the annotated data entries, the topic-specific content corresponding to the one or more sub-topics based on the comparing, and
(d) performing post-processing on the topic-specific content to obtain result data, by performing at least one from among a second filtering and a normalizing on sentences included in the topic-specific content,
wherein (c) and (d) are performed for a plurality of different target languages among the plurality of languages, the target language being a first target language of the plurality of different target languages,
outputting the result data for each of the plurality of different target languages as a plurality of model training datasets for the topic for which (c) and (d) were performed, and
transmitting, to the model training system, at least a first model training dataset among the plurality of model training datasets, the first model training dataset corresponding to the first target language,
wherein the model training system is configured to:
training a first machine learning model using the first model training dataset in the first target language, the training including inputting, into the first machine learning model, training examples from the first model training dataset, to obtain a set of values for model parameters for a first speech recognition model, and
generating the first speech recognition model in the first target language, for the topic for which (c) and (d) were performed, wherein the first speech recognition model is configured with the set of values for a set of predetermined sentiments or a set of predetermined intents,
wherein the first speech recognition model is configured to, based on one or more sentences provided as an input by a user in the first target language, identify a certain sentiment from the set of predetermined sentiments or a certain intent from the set of predetermined intents, and output, for the one or more sentences, a prediction of the certain sentiment or a prediction of the certain intent.

14. The system of claim 13, wherein:
(c) and (d) are performed for the plurality of topics in the plurality of different target languages, and
the outputting the result data further includes providing sets of result data that are obtained for each of the plurality of topics in the plurality of languages as a plurality of training datasets for building speech recognition models in the plurality of different target languages for the plurality of topics.

15. One or more non-transitory computer-readable media storing instructions which, when executed by one or more processors, cause a computer system comprising a model training system and a dataset generation system to perform operations including:
(a) obtaining, using the dataset generation system from a text corpus, a plurality of webpages in a plurality of languages, each of the plurality of webpages corresponding to a respective universal resource locator (URL),
(b) annotating, using the dataset generation system, each of the plurality of webpages based on the respective URL, to obtain annotated data entries, each of the annotated data entries corresponding to one of the plurality of webpages and comprising a classification label corresponding to a sub-topic of one of a plurality of topics, wherein each of the plurality of topics comprises a corresponding plurality of sub-topics,
(c) performing, using the dataset generation system, a first filtering for the annotated data entries to obtain topic-specific content in a target language among the plurality of languages by:
comparing one or more sub-topics among the corresponding plurality of sub-topics with classification labels correspondingly included in the annotated data entries, wherein the one or more sub-topics are associated with a topic among the plurality of topics, and
obtaining, from the annotated data entries, the topic-specific content corresponding to the one or more sub-topics based on the comparing, and
(d) performing, using the dataset generation system, post-processing on the topic-specific content to obtain result data, by performing at least one from among a second filtering and a normalizing on sentences included in the topic-specific content, wherein (c) and (d) are performed for a plurality of different target languages among the plurality of languages, the target language being a first target language of the plurality of different target languages, outputting, using the dataset generation system, the result data for each of the plurality of different target languages as a plurality of model training datasets for the topic for which (c) and (d) were performed, transmitting, from the dataset generation system to the model training system, at least a first model training dataset among the plurality of model training datasets, the first model training dataset corresponding to the first target language, training, using the model training system, a first machine learning model using the first model training dataset in the first target language, the training including inputting, into the first machine learning model, training examples from the first model training dataset, to obtain a set of values for model parameters for a first speech recognition model, and generating, using the model training system, the first speech recognition model in the first target language, for the topic for which (c) and (d) were performed, wherein the first speech recognition model is configured with the set of values for a set of predetermined sentiments or a set of predetermined intents, wherein the first speech recognition model is configured to, based on one or more sentences provided as an input by a user in the first target language, identify a certain sentiment from the set of predetermined sentiments or a certain intent from the set of predetermined intents, and output, for the one or more sentences, a prediction of the certain sentiment or a prediction of the certain intent.

16. The one or more non-transitory computer-readable media of claim 15, wherein:

(c) and (d) are performed for the plurality of topics in the plurality of different target languages, and the outputting the result data further includes providing sets of result data that are obtained for each of the plurality of topics in the plurality of languages as a plurality of training datasets for building speech recognition models in the plurality of different target languages for the plurality of topics.

* * * * *